United States Patent [19]

Reilly et al.

[11] Patent Number: 5,284,886

[45] Date of Patent: * Feb. 8, 1994

[54] NON-TOXIC POLYMERIC COMPOSITIONS STABILIZED WITH ORGANOSULFIDE ANTIOXIDANTS

[75] Inventors: James L. Reilly, Towamencin; Joseph M. Bohen, Upper Merion, both of Pa.

[73] Assignee: Elf Atochem North America, Inc., Philadelphia, Pa.

[*] Notice: The portion of the term of this patent subsequent to Jul. 9, 2008 has been disclaimed.

[21] Appl. No.: 735,140

[22] Filed: Jul. 24, 1991

Related U.S. Application Data

[63] Continuation-in-part of Ser. No. 429,899, Oct. 31, 1989, Pat. No. 5,070,124, Ser. No. 429,883, Oct. 31, 1989, Pat. No. 5,081,169, and Ser. No. 698,235, May 6, 1991, Pat. No. 5,096,947, which is a continuation of Ser. No. 429,682, Oct. 31, 1989, abandoned.

[51] Int. Cl.$^5$ ............................................. C08K 5/37
[52] U.S. Cl. ............................ 524/58; 524/292; 524/387; 524/368; 524/392
[58] Field of Search ............... 524/58, 368, 392, 291, 524/387

[56] References Cited

U.S. PATENT DOCUMENTS

| | | | |
|---|---|---|---|
| 2,522,590 | 9/1950 | Vaughn et al. | 204/158 |
| 2,809,956 | 10/1957 | Mack et al. | 260/45.75 |
| 2,868,765 | 1/1959 | Haefber et al. | 260/45.75 |
| 2,972,597 | 2/1961 | Newland et al. | 260/45.85 |
| 2,995,539 | 8/1961 | Barker et al. | 260/45.5 |
| 3,010,937 | 11/1961 | Roos et al. | 260/45.7 |
| 3,063,963 | 11/1962 | Wooten et al. | 260/45.75 |
| 3,067,166 | 12/1962 | Zaremsky | 260/45.75 |
| 3,167,527 | 1/1965 | Hechenbleikner et al. | 260/45.75 |
| 3,180,850 | 4/1965 | Schooten et al. | 260/45.95 |
| 3,214,422 | 10/1965 | Mageli et al. | 260/94.9 |
| 3,223,738 | 12/1965 | Crain et al. | 260/609 |
| 3,258,493 | 6/1966 | Springdale . | |
| 3,258,495 | 6/1966 | Whittier . | |
| 3,293,209 | 12/1966 | Baldwin et al. | 260/45.95 |
| 3,301,816 | 1/1967 | Burgess | 260/45.95 |
| 3,361,713 | 1/1968 | Meyer et al. | 260/45.85 |
| 3,413,264 | 11/1968 | Hechenblelkner et al. | 260/45.75 |
| 3,442,806 | 5/1969 | O'Neill | 252/46.4 |
| 3,483,159 | 12/1969 | Kauder | 260/45.75 |
| 3,503,924 | 3/1970 | Pollock | 260/45.75 |
| 3,507,827 | 4/1970 | Pollock | 260/45.75 |
| 3,534,121 | 10/1970 | Eggensperger et al. | 260/880 |
| 3,538,044 | 11/1970 | Buccholz | 260/45.75 |

(List continued on next page.)

FOREIGN PATENT DOCUMENTS

| | | |
|---|---|---|
| 720507 | 10/1965 | Canada . |
| 0177784 | 4/1986 | European Pat. Off. . |
| 0525664 | 7/1992 | European Pat. Off. . |
| 1265409 | 4/1968 | Fed. Rep. of Germany . |
| 1694210 | 4/1971 | Fed. Rep. of Germany . |
| 41-16184 | 9/1966 | Japan . |
| 43-21415 | 9/1968 | Japan . |

(List continued on next page.)

OTHER PUBLICATIONS

"ANTEC 88 Conf.", Apr. 18–21, 1988, Atlanta, Ga.
J. R. Shelton: "Organic Sulfur Compounds as Preventive Antioxidants", Developments in Polymer Stabilization–Apr. 23, 1969 Gerald Scott, ed., (1981).
The Vanderbilt Rubber Handbook, 308–318, 528–532, (1978).
Kirk-Othmer's Encyclopedia of Chemical Technology, 3rd Edition, vol. 17, pp. 27–90.
I&EC Product Research and Development, 1 (4), 1962 pp. 236–241, Neureiter & Bown, "Synergism between phenols and sulfides in the stabilization of polyolefins to oxidation".

(List continued on next page.)

Primary Examiner—Veronica P. Hoke
Attorney, Agent, or Firm—Stanley A. Marcus

[57] ABSTRACT

Non-toxic polymeric compositions suitable for use in the handling and packaging of foods, beverages or pharmaceuticals, or for use in medical devices, are stabilized against thermal and oxidative degradation with a organosulfide antioxidant having no more than 5 parts per million of free mercaptan groups.

34 Claims, No Drawings

U.S. PATENT DOCUMENTS

| | | | |
|---|---|---|---|
| 3,542,825 | 11/1970 | Hoye et al. | 260/429.7 |
| 3,565,931 | 2/1971 | Brecker | 200/429.7 |
| 3,574,165 | 4/1971 | Braus et al. | 260/45.95 |
| 3,594,448 | 7/1971 | Birenzuige et al. | 260/857 |
| 3,640,950 | 2/1972 | Weisfield | 260/45.75 K |
| 3,652,680 | 3/1972 | Buccholz | 260/609 E |
| 3,674,737 | 7/1972 | Brecker | 260/45.75 K |
| 3,715,333 | 2/1973 | Larkin | 260/45.75 R |
| 3,729,443 | 4/1973 | Peterli et al. | 260/45.95 C |
| 3,758,341 | 9/1973 | Wowk | 260/429.7 |
| 3,758,536 | 9/1973 | Wowk | 260/429.7 |
| 3,758,537 | 9/1973 | Wowk | 260/429.7 |
| 3,772,246 | 11/1973 | Buccholz | 260/42.95 R |
| 3,772,390 | 11/1973 | Song | 260/609 F |
| 3,773,556 | 11/1973 | Rowland et al. | 117/232 |
| 3,773,723 | 11/1973 | Cole | 260/45.85 S |
| 3,810,868 | 5/1974 | Weisfield et al. | 260/45.75 K |
| 3,823,191 | 7/1974 | Dighe | 260/609 P |
| 3,876,613 | 4/1975 | Needham et al. | 260/56.85 S |
| 3,887,519 | 6/1975 | Weisfield et al. | 260/45.75 K |
| 3,890,277 | 6/1975 | Kugele et al. | 260/45.75 S |
| 3,894,989 | 7/1975 | Collins et al. | 260/45.75 S |
| 3,919,168 | 11/1975 | Dieckmann | 260/45.75 S |
| 3,928,285 | 12/1975 | Gough et al. | 260/45.75 K |
| 3,932,353 | 1/1976 | Mastrola et al. | 260/45.75 G |
| 3,943,099 | 3/1976 | Bakassian et al. | 260/45.75 E |
| 3,952,072 | 4/1976 | Yonemistsu et al. | 260/874 |
| 3,970,678 | 7/1976 | Molt | 260/429.7 |
| 3,979,359 | 9/1976 | Kugele et al. | 260/45.75 S |
| 3,985,705 | 10/1976 | Georgoudis | 260/45.8 A |
| 3,988,378 | 10/1976 | Wirth et al. | 260/609 R |
| 4,021,468 | 5/1977 | Lind | 260/470 |
| 4,028,332 | 6/1977 | Needham et al. | 260/45.8 R |
| 4,029,618 | 6/1977 | Dieckmann | 260/23 XA |
| 4,059,570 | 11/1977 | Oswald | 260/77.5 AP |
| 4,062,881 | 12/1977 | Kugele | 260/399 |
| 4,082,808 | 4/1978 | Hay | 260/609 F |
| 4,111,903 | 9/1978 | Hoch et al. | 260/45.75 S |
| 4,118,371 | 10/1978 | Kugele | 260/45.75 S |
| 4,122,064 | 10/1978 | Scheidl et al. | 260/45.75 S |
| 4,134,879 | 1/1979 | Schmidt | 260/45.85 P |
| 4,144,154 | 3/1979 | Zapp et al. | 204/159.18 |
| 4,220,805 | 9/1980 | Carnahan | 568/592 |
| 4,221,699 | 9/1980 | Avnaud et al. | 260/45.75 |
| 4,254,017 | 3/1981 | Dowrkin et al. | 260/45.75 S |
| 4,255,320 | 3/1981 | Brecker et al. | 260/45.75 |
| 4,255,321 | 3/1981 | Brussen | 260/45.75 W |
| 4,273,942 | 6/1981 | Mark et al. | 568/42 |
| 4,274,999 | 6/1981 | Burley et al. | 260/45.75 S |
| 4,279,805 | 7/1981 | Ohzeki et al. | 260/45.9 NC |
| 4,303,759 | 12/1981 | Dixon et al. | 525/3 |
| 4,314,934 | 2/1982 | Smith et al. | 260/45.75 S |
| 4,330,462 | 5/1982 | Keck et al. | 524/331 |
| 4,345,040 | 8/1982 | Hall | 521/43 |
| 4,360,619 | 11/1982 | Kugele et al. | 524/181 |
| 4,374,205 | 2/1983 | Hall | 521/85 |
| 4,514,539 | 4/1985 | Hattrich et al. | 524/436 |
| 4,515,916 | 5/1985 | Molt | 524/99 |
| 4,526,916 | 7/1985 | White | 524/128 |
| 4,576,984 | 3/1986 | Bresser | 524/182 |
| 4,611,023 | 9/1986 | Spivak et al. | 524/326 |
| 4,659,762 | 4/1987 | Jenkins | 524/331 |
| 4,711,921 | 12/1987 | Lehr | 524/180 |
| 4,833,209 | 5/1989 | Beijleveld et al. | 525/298 |
| 4,880,856 | 11/1989 | Avakian | 524/136 |
| 4,904,717 | 2/1990 | Ho et al. | 524/392 |
| 5,013,782 | 5/1991 | Tateno | 524/417 |
| 5,030,679 | 7/1991 | Bohen et al. | 524/58 |
| 5,070,124 | 12/1991 | Bohen et al. | 524/151 |
| 5,081,169 | 1/1992 | Bohen et al. | 524/58 |
| 5,096,947 | 3/1992 | Bohen et al. | 524/58 |

FOREIGN PATENT DOCUMENTS

| | | |
|---|---|---|
| 50-105740 | 8/1975 | Japan . |
| 694474 | 7/1953 | United Kingdom . |
| 966929 | 8/1964 | United Kingdom . |
| 981346 | 1/1965 | United Kingdom . |
| 1001344 | 8/1965 | United Kingdom . |
| 1001347 | 8/1965 | United Kingdom . |
| 1015797 | 1/1966 | United Kingdom . |
| 1321157 | 6/1973 | United Kingdom . |

OTHER PUBLICATIONS

J. Weber & J. Paley, Encyclopedia of Chemical Technology, 3rd Edition (vol. 1) pp. 778–789 (1978).

Kmiec & Kamath, "Elastomer Crosslinking with diperoxyketals", Rubber World, Oct. 1983 pp. 26, 27, 30, 31 and 32.

S. S. Labara, Encyclopedia of Polymer Science & Engineering 2nd Edition, (vol. 4) pp. 350–395 (1986).

V. P. McGuiness, Encyclopedia of Polymer Science & Engineering 2nd Edition (vol. 4), pp. 418–449 (1986).

NON-TOXIC POLYMERIC COMPOSITIONS STABILIZED WITH ORGANOSULFIDE ANTIOXIDANTS

CROSS-REFERENCE TO RELATED APPLICATIONS

This application is a continuation-in-part of application Ser. No. 07/429,899, filed Oct. 31, 1989 now U.S. Pat. No. 5,070,124; application Ser. No. 07/429,883, filed Oct. 31, 1989 now U.S. Pat. No. 5,081,169; and application Ser. No. 07/698,235, filed May 6, 1991, now U.S. Pat. No. 5,096,947 which is a continuation of application Ser. No. 07/429,682, filed Oct. 31, 1989 now abandoned.

BACKGROUND OF THE INVENTION

The present invention relates to non-toxic polymeric compositions containing an organosulfide antioxidant and, more particularly, to such compositions which are adapted for the handling and packaging of foods, beverages or pharmaceuticals, or for use in medical devices.

In general, all plastics have a tendency to degrade or deteriorate, particularly when exposed to air or oxygen at elevated temperatures. The degree to which a polymer will degrade will vary from polymer to polymer. Upon thermal and oxidative degradation, plastics tend to become discolored and brittle, which detracts from their usefulness. In order to stabilize polymers against the deleterious effects of thermal and oxidative degradation, it is known in the art to incorporate small amounts of various phenolic, arylamine, phosphite, or sulfide antioxidants, alone or in combination.

U.S. Pat. Nos. 3,180,850, 3,258,493, 3,293,209, and 3,574,165 all teach the use of antioxidants as ingredients in polyolefin resins to protect the resins against both thermal and oxidative degradation.

U.S. Pat. Nos. 3,652,680 and 3,772,246 disclose certain cycloalkane bis(alkyl sulfides) for use in polyolefins as antioxidant synergists. These patents also report that these compounds have low toxicity, which is of value when used in polyolefin bottles and film for packaging materials. For example, beta-(n-octadecylthio) ethyl-3 (and 4)-(n-octadecylthio)cyclohexane was found to be non-toxic when administered orally to mice at doses as high as 10 grams per kilogram of body weight (g/kg).

Commonly assigned copending application Ser. No. 07/429,885, filed Oct. 31, 1989, which is hereby incorporated by reference, discloses substituted and unsubstituted alkylthiopropyl ethers suitable for use as antioxidants for polyolefin resins.

Commonly assigned copending application Ser. Nos. 07/429,889 and 07/429,883, both filed on Oct. 31, 1989, and 07/698,235, filed May 6, 1991, all of which are hereby incorporated by reference, disclose the use of three classes of sulfide antioxidants as thermal and oxidative stabilizers for engineering and cross-linked polyolefin resins. These sulfide antioxidants include the above referenced alkylthiopropyl ethers, bis [alkylthiopropyl(substituted and unsubstituted)] ethers, and cycloalkane bis- and tris(alkyl sulfides).

Antioxidants are also used with the styrenic resins, which includes both crystalline and non-crystaline homopolymers; expandable polystyrene beads; rubber-modified polystyrenes, such as high impact polystyrene (HIPS), medium impact polystyrene (MIPS), and super high impact polystyrenes; and block copolymers of styrene and butadiene, such as styrene-butadiene (SB), styrene-butadiene-styrene (SBS) and butadiene-styrene-butadiene (BSB). A further description of these resins may be found in the articles by N. L. Maecker and D. N. Armentrout in the "Encyclopedia of Polymer Science and Engineering", 2nd Ed., Vol. 16, pp. 179–193 (1989) and G. Riess, G.Hurtrez, and P. Bahadur, ibid., Vol 2, pp. 324–434 (1989).

Unsaturated polyesters are still another class of resins which may require antioxidants to improve stability at high use temperatures. These resins are generally prepared by reacting a mixture of diacids and/or anhydrides, in which at least one component is unsaturated, with a glycol to form a mixture of saturated and unsaturated diesters. This mixture is then dissolved in an unsaturated monomer, such as styrene, which is then cross-linked under free radical conditions to form a thermoset. The article by J. Selley in the "Encyclopedia of Polymer Science and Engineering", 2nd Ed., Vol. 12, pp. 256-29 1988 describes these resins in more detail.

Polymeric compositions are useful in the manufacture of textiles, coatings, packaging and molded articles. A major application area is in the production of coatings and packages for storing and handling of foods, beverages, and pharmaceuticals, and as components of medical devices that come in contact with body fluids. When used in these applications, the polymeric compositions, as well as the articles made therefrom, need to be "non-toxic" or safe for use by consumers for their intended purpose. These compositions and their components generally require the approval of appropriate health-regulatory agencies, such as the U.S Food and Drug Administration (USFDA).

In order for a material to qualify as a "food grade" (as defined by the USFDA) additive, it must not present any toxicity hazard at the highest use level at which it will be present in the food packaging material. The criteria for determining whether a given ingredient in a plastic material constitutes a toxicity hazard have been defined by the USFDA. These criteria are set forth in a comprehensive article that appeared in the October, 1955 issue of the Food Drug Cosmetic Law Journal, and can be summarized as follows:

(1) An ingredient of a plastic material which is not extracted by a foodstuff with which it is in contact does not constitute a hazard.

(2) If a material is found in a food as a result of contact with the plastic, that material may constitute a hazard if it is toxic in a biological sense, i.e., if it causes either an acute or chronic injurious effect by oral ingestion, inhalation, or absorption through the skin, in animal or humans. If no such effect can be shown, the material does not constitute a hazard.

(3) Acute toxicity levels are unlikely ever to be realized in practice. It is, however, possible that injurious effects may be produced by repeated small doses of a material extracted from the plastic and therefore it is the chronic toxicity which should be used for purposes of assessing the hazard.

(4) The toxicity hazard of a material is a function both of its chronic toxicity as well as its extractability from the plastic under service conditions.

(5) For the purpose of assessing the hazard, extractability studies must be carried out using the foodstuffs themselves or a range of representative extractants under conditions which simulate the most severe conditions likely to be encountered in practice. The results of these tests must be combined with the data on chronic toxicities of the plastic as expressed by their Toxicity Factors to give the Toxicity Quotient, which is a measured of the hazard.

To have a composition approved by the USFDA and other national health authorities as a food grade additive, an applicant must submit data from feeding studies on laboratory animals which demonstrates that the daily consumption of a candidate composition over an extended period of time at concentration levels above those that would be expected based on extractability of the composition from the packaging material does not noticeably impair the health of the animals or result in a sufficient accumulation in the blood, bones, and internal organs.

Prior to the enactment of the regulations concerning food grade additives, dilauryl and distearyl thiodipropionate antioxidants were approved by the USFDA for use in the manufacture of food packaging materials under 21 CFR 181.24. These thiodipropionate antioxidants did not undergo the rigorous test procedures now required by the USFDA for food grade additives. Distearyl and di(2,4 di-t-butylphenyl) pentaerythritol diphosphites have also been granted USFDA approval for use as antioxidants and/or stabilizers for polymers used in the manufacture of food packing materials (21 CFR 178 2010). The former diphosphite has approval for use in olefin polymers, polystyrene, and rubber-modified polystyrene, while the latter phosphite has approval for use in polyolefins.

Both thiodipropionate and the phosphite antioxidants are known in the art to suffer from hydrolytic instability due to the ester functionality. Sulfide antioxidants used in non-USFDA applications generally possess hydrolytic stability, but may contain one or more mercaptan-containing impurities, which are known in the art to impart highly obnoxious odors even when present at low levels in the stabilizer. Thus, there is a need for hydrolytically stable sulfide antioxidant for use in polymeric compositions, which are adapted for the handling and packaging of foods, beverages or pharmaceuticals, or for use in medical devices, having a low order of toxicity and being substantially free of obnoxious odors.

SUMMARY OF THE INVENTION

The present invention relates to non-toxic polymeric compositions comprising a thermoplastic or thermosetting resin and an organosulfide antioxidant having no more than about 5 parts per million (ppm) of free mercaptan groups and having the Formula I, II or III:

$$R(OCH_2CHCHSR^3)_n \quad \text{(I)}$$
$$\quad\quad\quad |\ \ \ |$$
$$\quad\quad\quad R^1\ R^2$$

$$O(CH_2CHCHSR^3)_2 \quad \text{(II)}$$
$$\quad\quad\quad |\ \ \ |$$
$$\quad\quad\quad R^1\ R^2$$

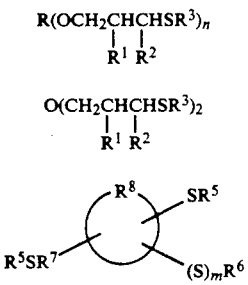

(III)

wherein:

m is 0 or 1;

n is an integer of 2 to 15;

R is a substituted or unsubstituted aliphatic group of 2 to 30 carbons, a substituted or unsubstituted alicyclic group of 5 to 20 carbons, a substituted or unsubstituted aliphatic group of 2 to 30 carbons where any of up to 6 carbon atoms are replaced with an O or S heteroatom, a substituted or unsubstituted alicyclic group of 5 to 20 carbons where any of up to 6 carbon atoms are replaced with an O or S heteroatom, with the proviso that the heteroatom must be separated from each other and from the portion of the compound to which the R group is bonded by at least one carbon atom, the substituents for R being —OH, —SR$^4$ or —OR$^4$, wherein R$^4$ is an alkyl group of 1 to 30 carbons or a cycloalkyl group of 5 to 20 carbons;

R$^1$ and R$^2$ are independently H or an alkyl group of 1 to 4 carbons;

R$^3$ is an alkyl group of 1 to 24 carbons or a cycloalkyl group of 5 to 20 carbons;

R$^5$ is an alkyl group of 1 to 24 carbons;

R$^6$ is H or an alkyl group of 1 to 24 carbons, with the provisos that when m=0, R$^6$ is H or an alkyl group of 1 to 7 carbons and when m=1, R$^6$ is alkyl group of 1 t 24 carbons;

R$^7$ is a direct bond or an alkylene group of 1 to 4 carbons; and

R$^8$ is a monocyclic, bicyclic or tricyclic cycloalkyl group of 5 to 16 carbons.

These organosulfide antioxidants have substantially no odor because of the low concentration of residual mercaptan groups.

The organosulfide antioxidants of the present invention are suitable for use as "food grade" additives, and, preferably, are characterized by an acute toxicity for rats (LD$_{50}$) of at least 1 g/kg and an extractibility from the thermoplastic or thermosetting polymer with food simulating solvents whereby the concentration in the human diet is less than 1 ppm. Thus, the non-toxic polymeric composition of this invention are suitable for use in the handling and packaging of foods, beverages or pharmaceuticals. These compositions may also be used as components of medical devices that come in contact with body fluids.

DETAILED DESCRIPTION OF THE PREFERRED EMBODIMENTS

The non-toxic polymeric compositions of this invention comprise a sulfide antioxidant having no more than about 5 parts per million (ppm) of free mercaptan groups. These mercaptan groups are impurities which are by-product(s) from the manufacture of the sulfide antioxidant. These sulfide antioxidants are represented by Formulas I, II, or III set forth below:

$$R(OCH_2CHCHSR^3)_n \quad \text{(I)}$$
$$\quad\quad\quad |\ \ \ |$$
$$\quad\quad\quad R^1\ R^2$$

$$O(CH_2CHCHSR^3)_2 \quad \text{(II)}$$
$$\quad\quad\quad |\ \ \ |$$
$$\quad\quad\quad R^1\ R^2$$

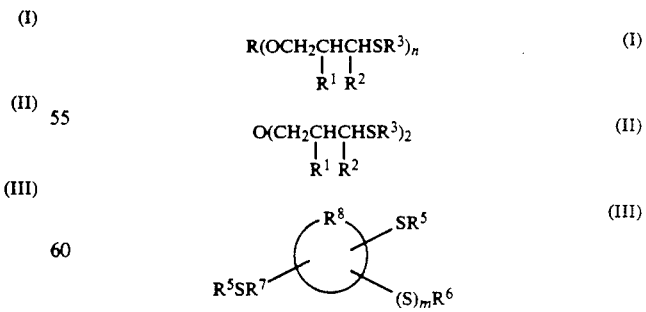

wherein:

m is 0 or 1;

n is an integer of 2 to 15;

R is a substituted or unsubstituted aliphatic group of 2 to 30 carbons, a substituted or unsubstituted alicyclic group of 5 to 20 carbons, a substituted or unsubstituted aliphatic group of 2 to 30 carbons where any of up to 6 carbon atoms are replaced with an O or S heteroatom, a substituted or unsubstituted alicyclic group of 5 to 20 carbons where any of up to 6 carbon atoms are replaced with an O or S heteroatom, with the proviso that the heteroatoms must be separated from each other and from the portion of the compound to which the R group is bonded by at least one carbon atom, the substituents for R being —OH, —SR$^4$ or —OR$^4$, wherein R$^4$ is an alky group of 1 to 30 carbons or cycloalkyl group of 5 to 20 carbons;

R$^1$ and R$^2$ are independently H or an alkyl group of 1 to 4 carbons;

R$^3$ is an alkyl group of 1 to 24 carbons or a cycloalkyl group of 5 to 20 carbons;

R$^5$ is an alkyl group of 1 to 24 carbons;

R$^6$ is H or an alkyl group of 1 to 24 carbons, with the provisos that when m=0, R$^6$ is H or an alkyl group of 1 to 7 carbons and when m=1, R$^6$ is an alkyl group of 1 to 24 carbons;

R$^7$ is a direct bond or an alkylene group of 1 to 4 carbons; and

R$^8$ is a monocyclic, bicyclic or tricyclic cycloalkyl group of 5 to 16 carbons.

Preferably, the organic sulfides of the present invention are those represented by Formulas I or II, wherein R is selected from the group consisting of

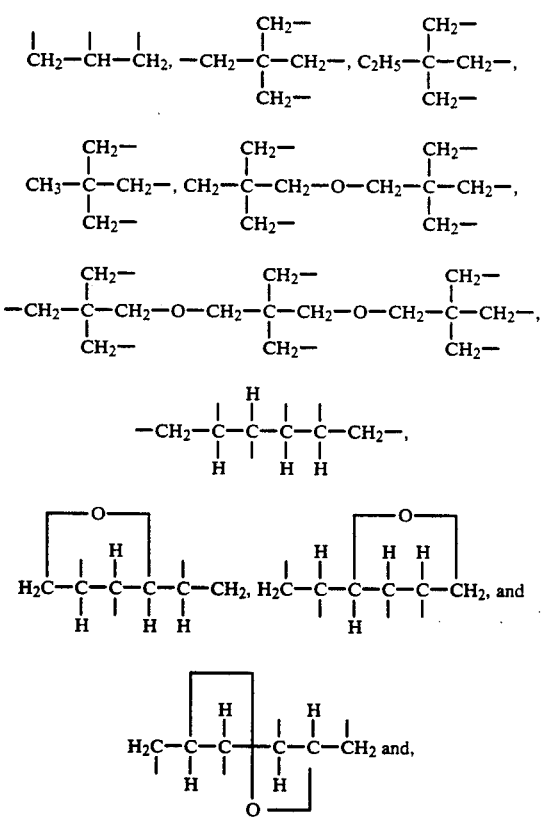

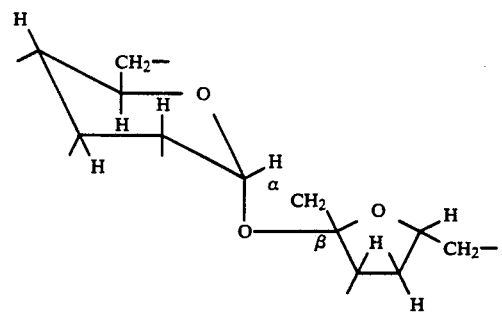

wherein
α and β are the types of linkages;
R$^1$ is H or —CH$_3$;
R$_2$ is H; and
R$^3$ is an alkyl group of 10 to 18 carbons.

More preferably, the organic sulfide antioxidants useful in the present composition are represented by Formula I or II, where R is represented by

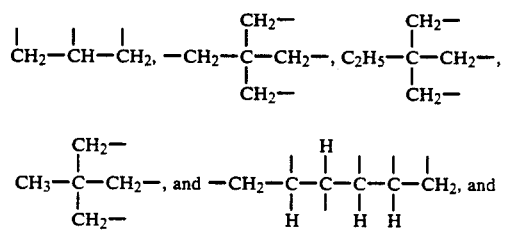

wherein
R$^1$ and R$^2$ are H; and
R$^3$ is an alkyl group of 12 to 18 carbons.

In the above-identified preferred and more preferred compounds, n is determined by the number of unattached bonds present in each R group.

The preferred organic sulfide antioxidants represented by Formula III are represented by one of the following structures:

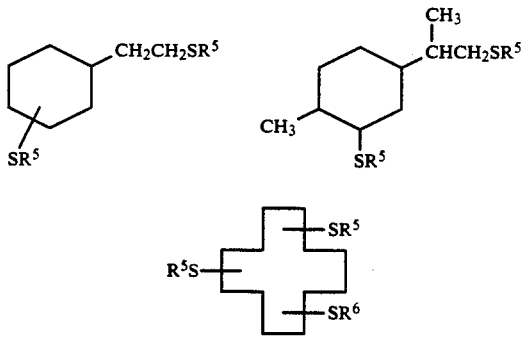

Non-limiting examples of representative organic sulfide antioxidants which are useful in the present composition are set forth below:

C$_{18}$H$_{37}$SCH$_2$CH$_2$CH$_2$O(CH$_2$CH$_2$O)$_6$CH$_2$CH$_2$OCH$_2$CH$_2$CH$_2$SC$_{18}$H$_{37}$
C$_{16}$H$_{33}$SCH$_2$CH$_2$CH$_2$O(CH$_2$CH$_2$SCH$_2$CH$_2$O)$_2$CH$_2$CH$_2$SCH$_2$CH$_2$OCH$_2$CH$_2$CH$_2$SC$_{16}$H$_{33}$

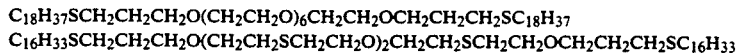
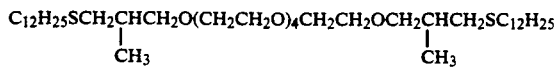

$C_{14}H_{29}SCH_2CH_2CH_2OCH_2CH_2OCH_2CH_2OCH_2CH_2SCH_2CH_2OCH_2CH_2CH_2SC_{14}H_{29}$ $C_8H_{17}SCH_2CHCH_2OCH_2CH_2OCH_2CH_2OCH_2CH_2SCH_2CH_2OCH_2CHCH_2SC_8H_{17}$
$\quad\quad\quad\quad\;\;|\quad\quad\quad\quad\quad\quad\quad\quad\quad\quad\quad\quad\quad\quad\quad\quad\quad\quad\quad\quad\quad\quad\quad\quad\quad\quad\quad\quad\quad\quad\quad\quad\;|$
$\quad\quad\quad\quad\;CH_3\quad\quad\quad\quad\quad\quad\quad\quad\quad\quad\quad\quad\quad\quad\quad\quad\quad\quad\quad\quad\quad\quad\quad\quad\quad\quad\quad\quad\quad\quad\;CH_3$ $C_{13}H_{27}SCH_2CH_2CH_2O(CH_2CH_2CH_2CH_2O)_4CH_2CH_2CH_2CH_2OCH_2CH_2CH_2SC_{13}H_{27}$ $H_2C-OCH_2CH_2CH_2SC_{18}H_{37}$
$HC-OCH_2CH_2CH_2SC_{18}H_{37}$
$H_2C-OCH_2CH_2CH_2SC_{18}H_{37}$ $H_2C-OCH_2CH_2CH_2SC_{14}H_{29}$
$HC-OCH_2CH_2CH_2SC_{14}H_{29}$
$H_2C-OCH_2CH_2CH_2SC_{14}H_{29}$ $H_2C-OCH_2CH_2CH_2SC_{12}H_{25}$
$HC-OCH_2CH_2CH_2SC_{12}H_{25}$
$H_2C-OCH_2CH_2CH_2SC_{12}H_{25}$ $H_2C-OCH_2CH_2CH_2SC_{13}H_{27}$
$HC-OCH_2CH_2CH_2SC_{13}H_{27}$
$H_2C-OCH_2CH_2CH_2SC_{13}H_{27}$ $H_2C-OCH_2CH_2CH_2SC_{16}H_{33}$
$HC-OCH_2CH_2CH_2SC_{16}H_{33}$
$H_2C-OCH_2CH_2CH_2SC_{16}H_{33}$ $H_2C-OCH_2CH_2CH_2SC_{17}H_{35}$
$HC-OCH_2CH_2CH_2SC_{17}H_{35}$
$H_2C-OCH_2CH_2CH_2SC_{17}H_{35}$ $H_2C-OCH_2CH_2CH_2SC_9H_{19}$
$HC-OCH_2CH_2CH_2SC_9H_{19}$
$H_2C-OCH_2CH_2CH_2SC_9H_{19}$ $H_2C-O-CH_2CHCH_2SC_{10}H_{21}$
$\quad\quad\quad\quad\quad\;|$
$\quad\quad\quad\quad\;CH_3$
$HC-O-CH_2CHCH_2SC_{10}H_{21}$
$\quad\quad\quad\quad\quad\;|$
$\quad\quad\quad\quad\;CH_3$
$H_2C-O-CH_2CHCH_2SC_{10}H_{21}$
$\quad\quad\quad\quad\quad\;|$
$\quad\quad\quad\quad\;CH_3$ $H_2C-OCH_2CH_2CH_2SC_8H_{17}$
$HC-OCH_2CH_2CH_2SC_8H_{17}$
$H_2C-OCH_2CH_2CH_2SC_8H_{17}$ $H_2C-OCH_2CH_2CH_2SC_4H_9$
$HC-OCH_2CH_2CH_2SC_4H_9$
$H_2C-OCH_2CH_2CH_2SC_4H_9$ $H_2C-OCH_2CHCH_2SC_8H_{17}$
$\quad\quad\quad\quad\;|$
$\quad\quad\quad\;CH_3$
$HC-OCH_2CHCH_2SC_8H_{17}$
$\quad\quad\quad\quad\;|$
$\quad\quad\quad\;CH_3$
$H_2C-OCH_2CHCH_2SC_8H_{17}$
$\quad\quad\quad\quad\;|$
$\quad\quad\quad\;CH_3$ $H_2C-OCH_2CHCH_2SC_{13}H_{27}$
$\quad\quad\quad\quad\;|$
$\quad\quad\quad\;CH_3$
$HC-OCH_2CHCH_2SC_{13}H_{27}$
$\quad\quad\quad\quad\;|$
$\quad\quad\quad\;CH_3$
$H_2C-OCH_2CHCH_2SC_{13}H_{27}$
$\quad\quad\quad\quad\;|$
$\quad\quad\quad\;CH_3$ $H_2C-OCH_2CHCH_2SC_{12}H_{25}$
$\quad\quad\quad\quad\;|$
$\quad\quad\quad\;CH_3$
$HC-OCH_2CHCH_2SC_{12}H_{25}$
$\quad\quad\quad\quad\;|$
$\quad\quad\quad\;CH_3$
$H_2C-OCH_2CHCH_2SC_{12}H_{25}$
$\quad\quad\quad\quad\;|$
$\quad\quad\quad\;CH_3$ $H_2C-OCH_2CH_2CHSC_{12}H_{25}$
$\quad\quad\quad\quad\quad\quad\;|$
$\quad\quad\quad\quad\quad\;CH_3$
$HC-OCH_2CH_2CHSC_{12}H_{25}$
$\quad\quad\quad\quad\quad\quad\;|$
$\quad\quad\quad\quad\quad\;CH_3$
$H_2C-OCH_2CH_2CHSC_{12}H_{25}$
$\quad\quad\quad\quad\quad\quad\;|$
$\quad\quad\quad\quad\quad\;CH_3$ $H_2C-OCH_2CHCH_2SC_{16}H_{33}$
$\quad\quad\quad\quad\;|$
$\quad\quad\quad\;CH_3$
$HC-OCH_2CHCH_2SC_{16}H_{33}$
$\quad\quad\quad\quad\;|$
$\quad\quad\quad\;CH_3$
$H_2C-OCH_2CHCH_2SC_{16}H_{33}$
$\quad\quad\quad\quad\;|$
$\quad\quad\quad\;CH_3$ $H_2C-OCH_2CHCH_2SC_{16}H_{33}$
$\quad\quad\quad\quad\;|$
$\quad\quad\quad\;C_3H_7$
$HC-OCH_2CHCH_2SC_{16}H_{33}$
$\quad\quad\quad\quad\;|$
$\quad\quad\quad\;C_3H_7$
$H_2C-OCH_2CHCH_2SC_{16}H_{33}$
$\quad\quad\quad\quad\;|$
$\quad\quad\quad\;C_3H_7$ $H_2C-OCH_2CHCH_2SC_{18}H_{37}$
$\quad\quad\quad\quad\;|$
$\quad\quad\quad\;CH_3$
$HC-OCH_2CHCH_2SC_{18}H_{37}$
$\quad\quad\quad\quad\;|$
$\quad\quad\quad\;CH_3$
$H_2C-OCH_2CH_2CH_2SC_{18}H_{37}$
$\quad\quad\quad\quad\;|$
$\quad\quad\quad\;CH_3$ $H_2C-OCH_2CH_2CH_2SC_{12}H_{25}$
$HC-OCH_2CHCH_2SC_{12}H_{25}$
$\quad\quad\quad\quad\;|$
$\quad\quad\quad\;CH_3$
$H_2C-OCH_2CH_2CH_2SC_{12}H_{25}$ $C(CH_2OCH_2CH_2CH_2SC_{12}H_{25})_3$
|
$CH_2$
|
$O$
|
$CH_2$
|
$C(CH_2OCH_2CH_2CH_2SC_{12}H_{25})_2$
|
$CH_2$
|
$O$
|
$CH_2$
|
$C(CH_2OCH_2CH_2CH_2SC_{12}H_{25})_3$ $C(CH_2OCH_2CHCH_2SC_8H_{17})_3$
|                    |
$CH_2$             $CH_3$
|
$O$
|
$CH_2$
|
$C(CH_2OCH_2CHCH_2SC_8H_{17})_2$
|                    |
$CH_2$             $CH_3$
|
$O$
|
$CH_2$
|
$C(CH_2OCH_2CHCH_2SC_8H_{17})_3$
                     |
                    $CH_3$ $H_2C-OCH_2CH_2CH_2S-\langle S \rangle$
$HC-OCH_2CH_2CH_2S-\langle S \rangle$
$H_2C-OCH_2CH_2CH_2S-\langle S \rangle$ $H_2C-OCH_2CH_2CH_2S-\langle S \rangle-C_6H_{13}$
$HC-OCH_2CH_2CH_2S-\langle S \rangle-C_6H_{13}$
$H_2C-OCH_2CH_2CH_2S-\langle S \rangle-C_6H_{13}$ $C(CH_2OCH_2CH_2CH_2SC_{18}H_{37})_4$
$C(CH_2OCH_2CH_2CH_2SC_{16}H_{33})_4$ $C(CH_2OCH_2CH_2CH_2SC_{20}H_{41})_4$
$C(CH_2OCH_2CH_2CH_2SC_{12}H_{25})_4$ $C(CH_2OCH_2CH_2CH_2SC_{13}H_{27})_4$
$C(CH_2OCH_2CH_2CH_2SC_{10}H_{21})_4$ $C(CH_2OCH_2CH_2CH_2SC_8H_{17})_4$
$C(CH_2OCH_2CH_2CH_2SC_{14}H_{29})_4$ $C(CH_2OCH_2CHCH_2SC_{16}H_{33})_4$
                |
               $CH_3$ -continued $H_2C-OCH_2CHCH_2SC_{16}H_{33}$
            |
           $CH_3$
$HC-OCH_2CH_2CH_2SC_9H_{19}$
$H_2C-OCH_2CH_2CH_2SC_9H_{19}$ $C(CH_2OCH_2CHSC_8H_{17})_3$
|                    |
$CH_2$             $CH_3$
|
$O$
|
$CH_2$
|
$C(CH_2OCH_2CHCH_2SC_{10}H_{21})_3$
                     |
                    $C_3H_7$ $CH_3$
                     |
$C(CH_2OCH_2CHCH_2SC_{12}H_{25})_3$
|
$CH_2$
|
$O$
|
$CH_2$
|
$C(CH_2OCH_2CH_2CH_2SC_{16}H_{33})_3$ $C(CH_2OCH_2CHCH_2SC_{18}H_{37})_4$
                |
               $CH_3$ $C(CH_2OCH_2CHCH_2SC_{12}H_{25})_4$
                |
               $CH_3$ $C(CH_2OCH_2CHCH_2SC_9H_{19})_4$
                |
               $CH_3$ $C(CH_2OCH_2CH_2CHSC_{12}H_{25})_4$
                   |
                  $CH_3$ $C(CH_2OCH_2CH_2CHSC_{16}H_{33})_4$
                   |
                  $CH_3$ $C(CH_2OCH_2CH_2CHSC_{10}H_{21})_4$
                   |
                  $CH_3$ $C(CH_2OCH_2CHCH_2SC_{12}H_{25})_4$
                |
               $C_3H_7$ $C(CH_2OCH_2CH_2CHSC_{18}H_{37})_4$
                   |
                  $C_4H_9$ $C-(CH_2OCH_2CH_2CH_2SC_{12}H_{25})_2$
  \
   $(CH_2OCH_2CH_2CH_2SC_{16}H_{33})_2$ -continued

C(CH₂OCH₂CHCH₂SC₈H₁₇)₄
            |
            CH₃

C(CH₂OCH₂CHCH₂SC₂H₅₄)
            |
            CH₃

```
    (CH₂OCH₂CHCH₂SC₁₆H₃₃)₂
   /              |
  C               CH₃
   \
    (CH₂OCH₂CHCH₂S(C₁₂H₂₅)₂
```

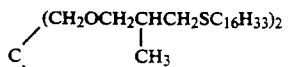

C—(CH₂OCH₂CH₂CH₂S—⟨S⟩)₄

C(CH₂OCH₂CH₂CH₂C₁₂H₂₅)₃
|
CH₂
|
O
|
CH₂
|
C(CH₂OCH₂CH₂CH₂C₁₂H₂₅)₃

C(CH₂OCH₂CH₂CH₂C₁₆H₃₃)₃
|
CH₂
|
O
|
CH₂
|
C(CH₂OCH₂CH₂CH₂C₁₆H₃₃)₃

C(CH₂OCH₂CH₂CH₂SC₁₈H₃₇)₃
|
CH₂
|
O
|
CH₂
|
C(CH₂OCH₂CH₂CH₂SC₁₈H₃₇)₃

C(CH₂OCH₂CH₂CHSCH₃)₃
|           |
CH₂         CH₃
|
O
|
CH₂
|
C(CH₂OCH₂CH₂CHSCH₃)₃
            |
            CH₃

C(CH₂OCH₂CH₂CH₂SC₁₀H₂₁)₃
|
CH₂
|
O
|
CH₂
|
C(CH₂OCH₂CH₂CH₂SC₁₀H₂₁)₃

```
    (CH₂OCH₂CHCH₂SC₁₈H₃₇)₂
   /              |
  C               CH₃
   \
    (CH₂OCH₂CHCH₂SC₉H₁₉)₂
                  |
                  CH₃
```

```
    CH₂OCH₂CH₂CHSC₁₃H₂₇
   /            |
  C             CH₃
   \
    (CH₂OCH₂CHCH₂SC₈H₁₇)₃
                |
                C₂H₅
```

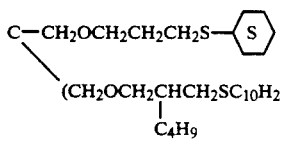

C(CH₂OCH₂CH₂CH₂SC₈H₁₇)₃
|
CH₂
|
O
|
CH₂
|
C(CH₂OCH₂CH₂CH₂SC₈H₁₇)₃

C(CH₂OCH₂CH₂CH₂SC₉H₁₉)₃
|
CH₂
|
O
|
CH₂
|
C(CH₂OCH₂CH₂CH₂SC₉H₁₉)₃

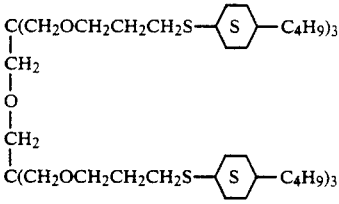

C(CH₂OCH₂CH₂CHSC₆H₁₃)₃
|           |
CH₂         CH₃
|
O
|
CH₂
|
C(CH₂OCH₂CH₂CHSC₆H₁₃)₃
            |
            CH₃

C(CH₂OCH₂CHCH₂SC₁₂H₂₅)₃
|           |
CH₂         CH₃
|
O
|
CH₂
|
C(CH₂OCH₂CHCH₂SC₁₂H₂₅)₃
            |
            CH₃

-continued $$C(CH_2OCH_2CH_2CH_2SC_{20}H_{41})_3$$
$$|$$
$$CH_2$$
$$|$$
$$O$$
$$|$$
$$CH_2$$
$$|$$
$$C(CH_2OCH_2CH_2CH_2SC_{20}H_{41})_3$$

$$C(CH_2OCH_2CHCH_2SC_9H_{19})_3$$
$$|\qquad\qquad\quad|$$
$$CH_2\qquad\quad CH_3$$
$$|$$
$$O$$
$$|$$
$$CH_2$$
$$|$$
$$C(CH_2OCH_2CHCH_2SC_9H_{19})_3$$
$$\qquad\quad|$$
$$\qquad\quad CH_3$$

$$C(CH_2OCH_2CH_2CH_2SC_{13}H_{27})_3$$
$$|$$
$$CH_2$$
$$|$$
$$O$$
$$|$$
$$CH_2$$
$$|$$
$$C(CH_2OCH_2CH_2CH_2SC_{13}H_{27})_3$$

$$C(CH_2OCH_2CHCH_2SC_{16}H_{33})_3$$
$$|\qquad\qquad\quad|$$
$$CH_2\qquad\quad CH_3$$
$$|$$
$$O$$
$$|$$
$$CH_2$$
$$|$$
$$C(CH_2OCH_2CHCH_2SC_{16}H_{33})_3$$
$$\qquad\quad|$$
$$\qquad\quad CH_3$$

$$C(CH_2OCH_2CH_2CH_2SC_{11}H_{23})_3$$
$$|$$
$$CH_2$$
$$|$$
$$O$$
$$|$$
$$CH_2$$
$$|$$
$$C(CH_2OCH_2CH_2CH_2SC_{11}H_{23})_3$$

$$C(CH_2OCH_2CHCH_2SC_{18}H_{37})_3$$
$$|\qquad\qquad\quad|$$
$$CH_2\qquad\quad CH_3$$
$$|$$
$$O$$
$$|$$
$$CH_2$$
$$|$$
$$C(CH_2OCH_2CHCH_2SC_{18}H_{37})_3$$
$$\qquad\quad|$$
$$\qquad\quad CH_3$$

$$C(CH_2OCH_2CHCH_2SC_{15}H_{31})_3$$
$$|\qquad\qquad\quad|$$
$$CH_2\qquad\quad CH_3$$
$$|$$
$$O$$
$$|$$
$$CH_2$$
$$|$$
$$C(CH_2OCH_2CHCH_2SC_{15}H_{31})_3$$
$$\qquad\quad|$$
$$\qquad\quad CH_3$$

$$C\!-\!(CH_2OCH_2CH_2CH_2SC_{16}H_{33})_2$$
$$|\;\backslash CH_2OCH_2CH_2CH_2SC_{12}H_{25}$$
$$CH_2$$
$$|$$
$$O$$
$$|$$
$$CH_2$$
$$|$$
$$C(CH_2OCH_2CH_2CH_2SC_{12}H_{25})_3$$

$$C(CH_2OCH_2CH_2CHSC_{12}H_{25})_3$$
$$|\qquad\qquad\quad|$$
$$CH_2\qquad\quad CH_3$$
$$|$$
$$O$$
$$|$$
$$CH_2$$
$$|$$
$$C(CH_2OCH_2CH_2CHSC_{12}H_{25})_3$$
$$\qquad\qquad|$$
$$\qquad\qquad CH_3$$

$$C\!-\!CH_2OCH_2CH_2SC_{13}H_{27}$$
$$|\;\backslash (CH_2OCH_2CH_2CH_2SC_{18}H_{37})_2$$
$$CH_2$$
$$|$$
$$O$$
$$|$$
$$CH_2$$
$$|$$
$$C\!-\!CH_2OCH_2CH_2CH_2SC_{13}H_{27}$$
$$\;\;\backslash (CH_2OCH_2CH_2CH_2SC_{18}H_{37})_2$$

$$C(CH_2OCH_2CH_2CHSC_{20}H_{41})_3$$
$$|\qquad\qquad\quad|$$
$$CH_2\qquad\quad CH_3$$
$$|$$
$$O$$
$$|$$
$$CH_2$$
$$|$$
$$C(CH_2OCH_2CHCH_2SC_{17}H_{35})_3$$
$$\qquad\quad|$$
$$\qquad\quad CH_3$$

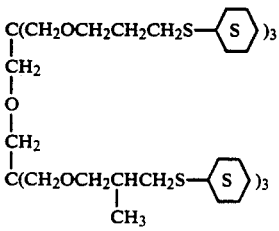

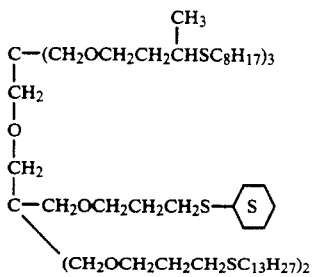
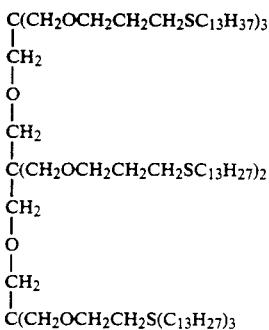
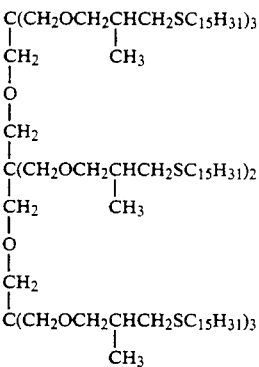
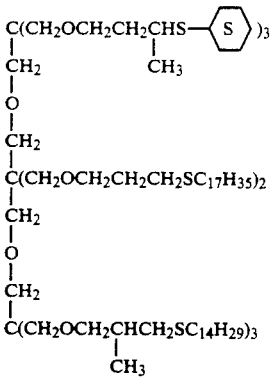
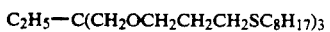
C₂H₅—C(CH₂OCH₂CH₂CH₂SC₈H₁₇)₃
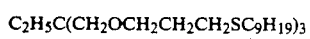
C₂H₅C(CH₂OCH₂CH₂CH₂SC₉H₁₉)₃
-continued
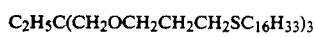
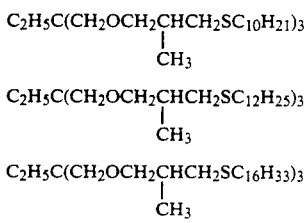
C₂H₅C(CH₂OCH₂CH₂CH₂SC₁₆H₃₃)₃
C₂H₅C(CH₂OCH₂CH₂CH₂SC₁₈H₃₇)₃
C₂H₅C(CH₂OCH₂CH₂CH₂SC₂₀H₄₁)₃
C₂H₅C(CH₂OCH₂CHCH₂SC₈H₁₇)₃
                |
                CH₃
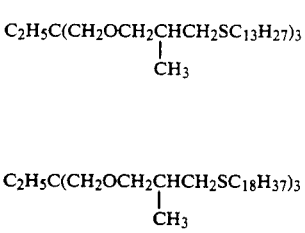
C₂H₅C(CH₂OCH₂CHCH₂SC₁₃H₂₇)₃
                |
                CH₃
C₂H₅C(CH₂OCH₂CHCH₂SC₁₈H₃₇)₃
                |
                CH₃
C₂H₅C(CH₂OCH₂CH₂CHSC₁₂H₂₅)₃
                |
                CH₃
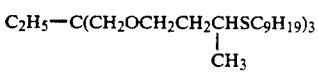
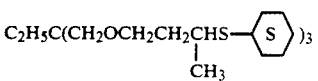

$C_2H_5C(CH_2OCH_2CH_2CH_2SC_{10}H_{21})_3$ $C_2H_5C(CH_2OCH_2CH_2CH_2SC_{13}H_{27})_3$ $C_2H_5C(CH_2OCH_2CH_2CH_2SC_{14}H_{29})_3$ $CH_3C(CH_2OCH_2CH_2CH_2SC_{10}H_{21})_3$
$CH_3C(CH_2OCH_2CH_2CH_2SC_8H_{17})_3$
$CH_3C(CH_2OCH_2CH_2CH_2SC_9H_{19})_3$ $CH_3C(CH_2OCH_2CH_2CH_2SC_{11}H_{23})_3$
$CH_3C(CH_2OCH_2CH_2CH_2SC_{12}H_{25})_3$
$CH_3(CH_2OCH_2CH_2CH_2SC_{13}H_{27})_3$
$CH_3C(CH_2OCH_2CH_2CH_2SC_{14}H_{29})_3$
$CH_3C(CH_2OCH_2CH_2CH_2SC_{16}H_{33})_3$ $CH_3C(CH_2OCH_2CH_2CH_2SC_{18}H_{37})_3$
$CH_3C(CH_2OCH_2CH_2CH_2SC_{19}H_{39})_3$ $CH_3C(CH_2OCH_2CHCH_2SC_8H_{17})_3$
$\quad\quad\quad\quad\quad\quad\quad\quad\quad CH_3$ $O(CH_2CH_2CH_2SC_8H_{17})_2$
$O(CH_2CHCH_2SC_{10}H_{21})_2$
$\quad\quad CH_3$
$O(CH_2CH_2CH_2SC_{12}H_{25})_2$
$O(CH_2CHCH_2SC_{13}H_{27})_2$
$\quad\quad C_2H_5$ $CH_3C(CH_2OCH_2CHCH_2SC_{10}H_{21})_3$
$\quad\quad\quad\quad\quad\quad CH_3$ $CH_3C(CH_2OCH_2CHCH_2SC_{12}H_{25})_3$
$\quad\quad\quad\quad\quad\quad CH_3$ $CH_3C(CH_2OCH_2CHCH_2SC_{16}H_{33})_2$
$\quad\quad\quad\quad\quad\quad CH_3$ $CH_3C(CH_2OCH_2CHCH_2SC_{18}H_{37})_3$
$\quad\quad\quad\quad\quad\quad CH_3$ $CH_3C(CH_2OCH_2CH_2CHSC_{12}H_{25})_3$
$\quad\quad\quad\quad\quad\quad CH_3$ $CH_3C(CH_2OCH_2CH_2CHS\text{-⬡-}C_6H_{13})_3$
$\quad\quad\quad\quad\quad\quad CH_3$ -continued $C_2H_5C\text{—}(CH_2OCH_2CH_2CH_2SC_{12}H_{25})_2$
$\quad\quad\quad\quad CH_2OCH_2CH_2CH_2SC_{16}H_{33}$ $\quad\quad\quad (CH_2OCH_2CHCH_2SC_8H_{17})_2$
$C_2H_5C\quad\quad\quad\quad\quad C_4H_9$
$\quad\quad\quad CH_2OCH_2CHCH_2SC_{10}H_{21}$
$\quad\quad\quad\quad\quad\quad\quad C_4H_9$ $CH_3C\text{—}(CH_2OCH_2CH_2CH_2SC_{12}H_{25})_2$
$\quad\quad CHOCH_2CHCH_2SC_{12}H_{25}$
$\quad\quad\quad\quad\quad CH_3$ $\quad\quad CH_2OCH_2CH_2CH_2SC_{10}H_{21}$
$CH_3C\text{—}CH_2OCH_2CH_2CH_2SC_{12}H_{25}$
$\quad\quad CH_2OCH_2CH_2CH_2SC_{16}H_{33}$
$\quad\quad CH_3C(CH_2OCHCH_2SC_{12}H_{25})_3$
$\quad\quad\quad\quad\quad\quad C_3H_7$ $\quad\quad\quad\quad CH_2OCH_2CH_2CH_2SC_{12}H_{25}$
$\quad\quad\quad\quad HCO\text{—}CH_2CH_2CH_2SC_{12}H_{25}$
$C_{12}H_{25}SCH_2CH_2CH_2O\text{—}CH$
$\quad\quad\quad\quad HCO\text{—}CH_2CH_2CH_2SC_{12}H_{25}$
$\quad\quad\quad\quad HCO\text{—}CH_2CH_2CH_2SC_{12}H_{25}$
$\quad\quad\quad\quad CH_2OCH_2CH_2CH_2SC_{12}H_{25}$ $O(CH_2CH_2CH_2SC_{16}H_{33})_2$
$O(CH_2CH_2CHSC_9H_{19})_2$
$\quad\quad CH_3$
$O(CH_2CH_2CH_2SC_{18}H_{37})_2$ $\quad\quad\quad\quad CH_2OCH_2CH_2CH_2SC_{16}H_{33}$
$\quad\quad\quad\quad HCO\text{—}CH_2CH_2CH_2SC_{16}H_{33}$
$C_{16}H_{33}SCH_2CH_2CH_2O\text{—}CH$
$\quad\quad\quad\quad HCO\text{—}CH_2CH_2CH_2SC_{16}H_{33}$
$\quad\quad\quad\quad HCO\text{—}CH_2CH_2CH_2SC_{16}H_{33}$
$\quad\quad\quad\quad CH_2OCH_2CH_2CH_2SC_{16}H_{33}$ $\quad\quad\quad\quad CH_2OCH_2CH_2CH_2SC_{18}H_{37}$
$\quad\quad\quad\quad HCO\text{—}CH_2CH_2CH_2SC_{18}H_{37}$
$C_{18}H_{37}SCH_2CH_2CH_2O\text{—}CH$
$\quad\quad\quad\quad HCO\text{—}CH_2CH_2CH_2SC_{18}H_{37}$
$\quad\quad\quad\quad HCO\text{—}CH_2CH_2CH_2SC_{18}H_{37}$
$\quad\quad\quad\quad CH_2OCH_2CH_2CH_2SC_{18}H_{37}$ -continued $$\begin{array}{l}CH_2OCH_2CH_2CH_2SC_8H_{17}\\HCOCH_2CH_2CH_2SC_8H_{17}\\C_8H_{17}SCH_2CH_2CH_2OCH\\HCOCH_2CH_2CH_2SC_8H_{17}\\HCOCH_2CH_2CH_2SC_8H_{17}\\CH_2OCH_2CH_2CH_2SC_8H_{17}\end{array}$$

$$\begin{array}{l}CH_2OCH_2CH_2CH_2SC_9H_{19}\\HCOCH_2CH_2CH_2SC_9H_{19}\\C_9H_{19}SCH_2CH_2CH_2OCH\\HCOCH_2CH_2CH_2SC_9H_{19}\\HCOCH_2CH_2CH_2SC_9H_{19}\\CH_2OCH_2CH_2CH_2SC_9H_{19}\end{array}$$

$$\begin{array}{l}CH_2OCH_2CH_2CH_2SC_{10}H_{21}\\HCOCH_2CH_2CH_2SC_{10}H_{21}\\C_{10}H_{21}SCH_2CH_2CH_2OCH\\HCOCH_2CH_2CH_2SC_{10}H_{21}\\HCOCH_2CH_2CH_2SC_{10}H_{21}\\CH_2OCH_2CH_2CH_2SC_{10}H_{21}\end{array}$$

$$\begin{array}{l}CH_2OCH_2CHCH_2SC_{12}H_{25}\\\quad\quad\quad|\\\quad\quad\quad CH_3\\HCOCH_2CHCH_2SC_{12}H_{25}\\C_{12}H_{25}SCH_2CHCH_2OCH\quad CH_3\\\quad\quad|\\\quad\quad CH_3\quad HCOCH_2CHCH_2SC_{12}H_{25}\\\quad\quad\quad|\\\quad\quad\quad CH_3\\HCOCH_2CHCH_2SC_{12}H_{25}\\\quad\quad\quad|\\\quad\quad\quad CH_3\\CH_2OCH_2CHCH_2SC_{12}H_{25}\\\quad\quad\quad|\\\quad\quad\quad CH_3\end{array}$$

$$\begin{array}{l}CH_2OCH_2CH_2CH_2SC_{13}H_{27}\\HCOCH_2CH_2CH_2SC_{13}H_{27}\\C_{13}H_{27}SCH_2CH_2CH_2OCH\\HCOCH_2CH_2CH_2SC_{13}H_{27}\\HCOCH_2CH_2CH_2SC_{13}H_{27}\\CH_2OCH_2CH_2CH_2SC_{13}H_{27}\end{array}$$

$$\begin{array}{l}CH_2OCH_2CHCH_2SC_{16}H_{33}\\\quad\quad\quad|\\\quad\quad\quad CH_3\\HCOCH_2CHCH_2SC_{16}H_{33}\\C_{16}H_{33}SCH_2CHCH_2OCH\quad CH_3\\\quad\quad|\\\quad\quad CH_3\quad HCOCH_2CHCH_2SC_{16}H_{33}\\\quad\quad\quad|\\\quad\quad\quad CH_3\\HCOCH_2CHCH_2SC_{16}H_{33}\\\quad\quad\quad|\\\quad\quad\quad CH_3\\CH_2OCH_2CHCH_2SC_{16}H_{33}\\\quad\quad\quad|\\\quad\quad\quad CH_3\end{array}$$

$$\begin{array}{l}CH_2OCH_2CHCH_2SC_{18}H_{37}\\\quad\quad\quad|\\\quad\quad\quad CH_3\\HCOCH_2CHCH_2SC_{18}H_{37}\\C_{18}H_{37}SCH_2CHCH_2OCH\quad CH_3\\\quad\quad|\\\quad\quad CH_3\quad HCOCH_2CHCH_2SC_{18}H_{37}\\\quad\quad\quad|\\\quad\quad\quad CH_3\\HCOCH_2CHCH_2SC_{18}H_{37}\\\quad\quad\quad|\\\quad\quad\quad CH_3\\CH_2OCH_2CHCH_2SC_{18}H_{37}\\\quad\quad\quad|\\\quad\quad\quad CH_3\end{array}$$

$$\begin{array}{l}CH_2OCH_2CH_2CHSC_{16}H_{33}\\\quad\quad\quad|\\\quad\quad\quad CH_3\\HCOCH_2CH_2CHSC_{16}H_{33}\\C_{16}H_{33}SSCHCH_2CH_2OCH\quad CH_3\\\quad\quad|\\\quad\quad CH_3\quad HCOCH_2CH_2CHSC_{16}H_{33}\\\quad\quad\quad|\\\quad\quad\quad CH_3\\HCOCH_2CH_2CHSC_{16}H_{33}\\\quad\quad\quad|\\\quad\quad\quad CH_3\\CH_2OCH_2CH_2CHSC_{16}H_{33}\\\quad\quad\quad|\\\quad\quad\quad CH_3\end{array}$$

$$\begin{array}{l}CH_2OCH_2CHCH_2S-\langle S\rangle\\\quad\quad\quad|\\\quad\quad\quad CH_3\\HCOCH_2CHCH_2S-\langle S\rangle\\\langle S\rangle-SCH_2CHCH_2OCH\quad CH_3\\\quad\quad|\\\quad\quad CH_3\quad HCOCH_2CHCH_2S-\langle S\rangle\\\quad\quad\quad|\\\quad\quad\quad CH_3\\HCOCH_2CHCH_2S-\langle S\rangle\\\quad\quad\quad|\\\quad\quad\quad CH_3\\CH_2OCH_2CHCH_2S-\langle S\rangle\\\quad\quad\quad|\\\quad\quad\quad CH_3\end{array}$$

$$\begin{array}{l}CH_2OCH_2CH_2CHSC_{10}H_{21}\\\quad\quad\quad|\\\quad\quad\quad CH_3\\HCOCH_2CH_2CHSC_{10}H_{21}\\C_{10}H_{21}SCHCH_2CH_2OCH\quad CH_3\\\quad\quad|\\\quad\quad CH_3\quad HCOCH_2CH_2CHSC_{10}H_{21}\\\quad\quad\quad|\\\quad\quad\quad CH_3\\HCOCH_2CH_2CHSC_{10}H_{21}\\\quad\quad\quad|\\\quad\quad\quad CH_3\\CH_2OCH_2CH_2CHSC_{10}H_{21}\\\quad\quad\quad|\\\quad\quad\quad CH_3\end{array}$$

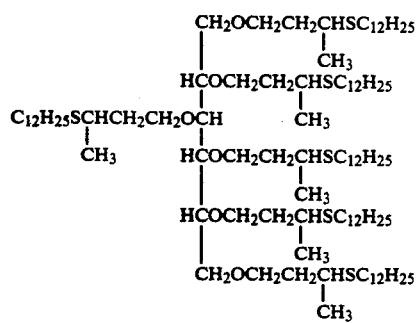

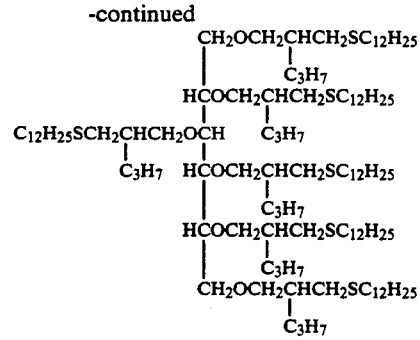

In the following non-limiting examples of representative structures for the organic sulfide antioxidants of the present invention, the sorbitan backbone shown is a 1,4-sorbitan, which comprises approximately 85% of the sorbitan conventionally used. Sorbitan also contains approximately 13% of 3,6-sorbitan and about 2% of 2,5-anyhdro-L-iditol (both isomers of 1,4-sorbitan). Accordingly it will be understood by one skilled in the art that the organic sulfide antioxidants set forth below, which are derived from 1,4-sorbitan, also include those derived from 3,6-sorbitan and 2,5- anhydro-L-iditol.

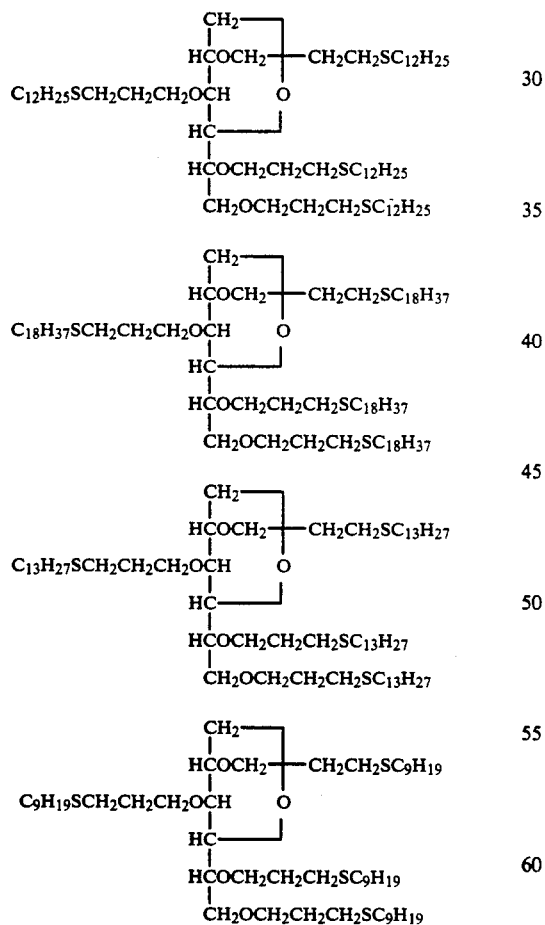

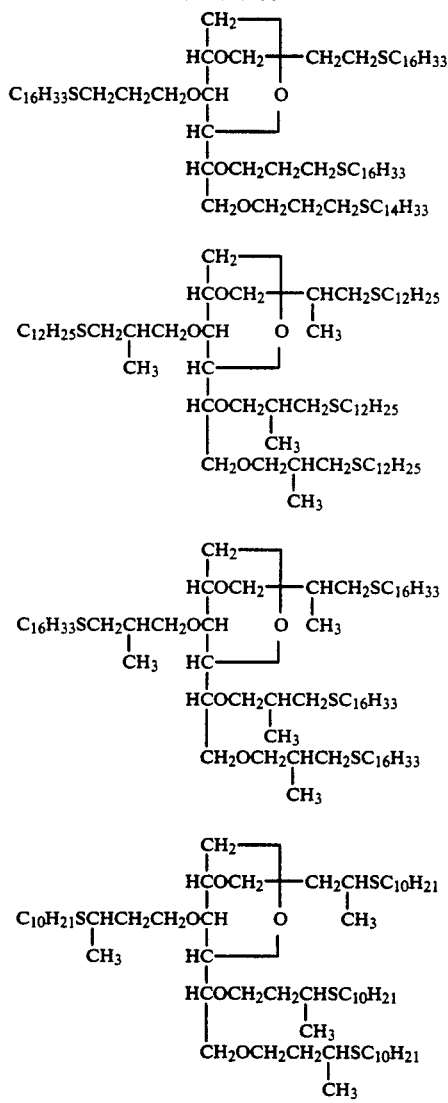

-continued
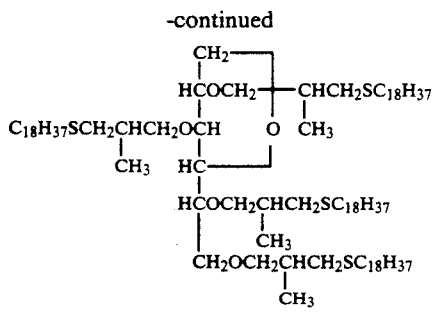
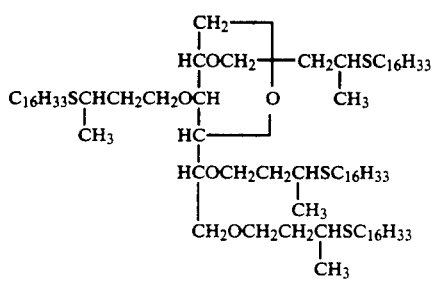
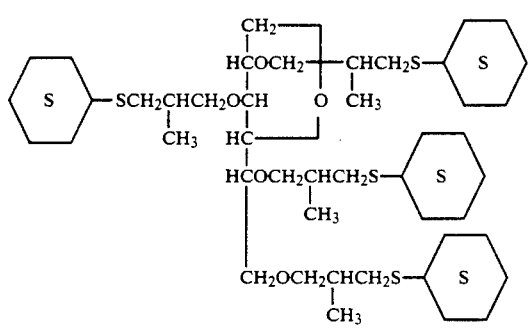
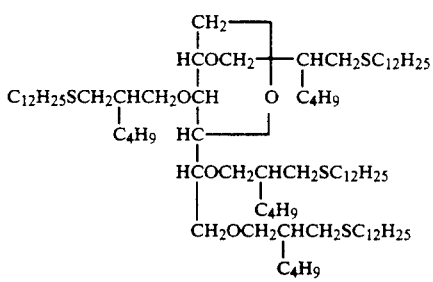
In the following non-limiting examples of representative organic sulfide antioxidants useful in the present invention which are derived from sucrose,
Z is $CH_2CH_2CH_2SR^3$; $Z^1$ is
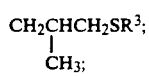
$Z^2$ is
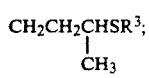
and $R^3$ is as defined above.
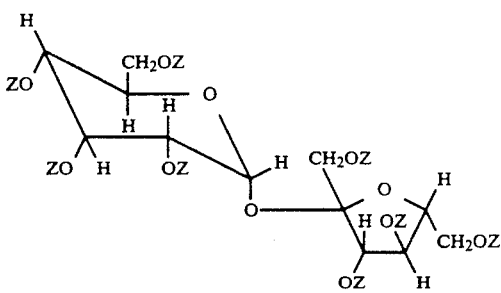
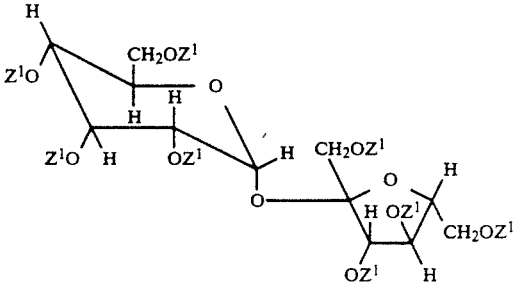
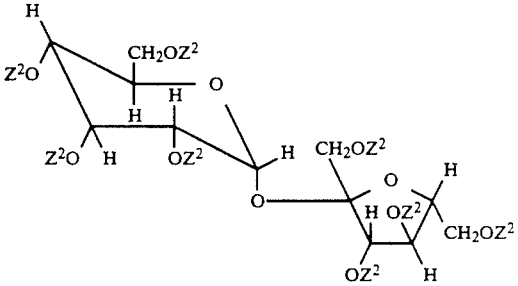
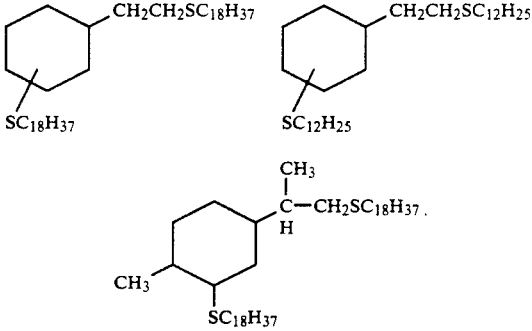
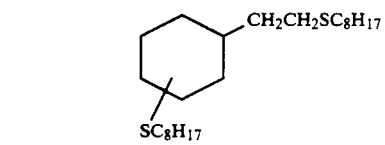
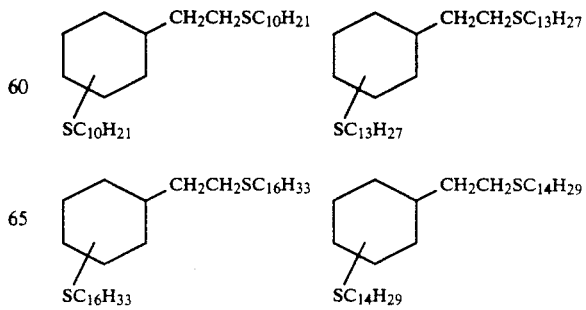

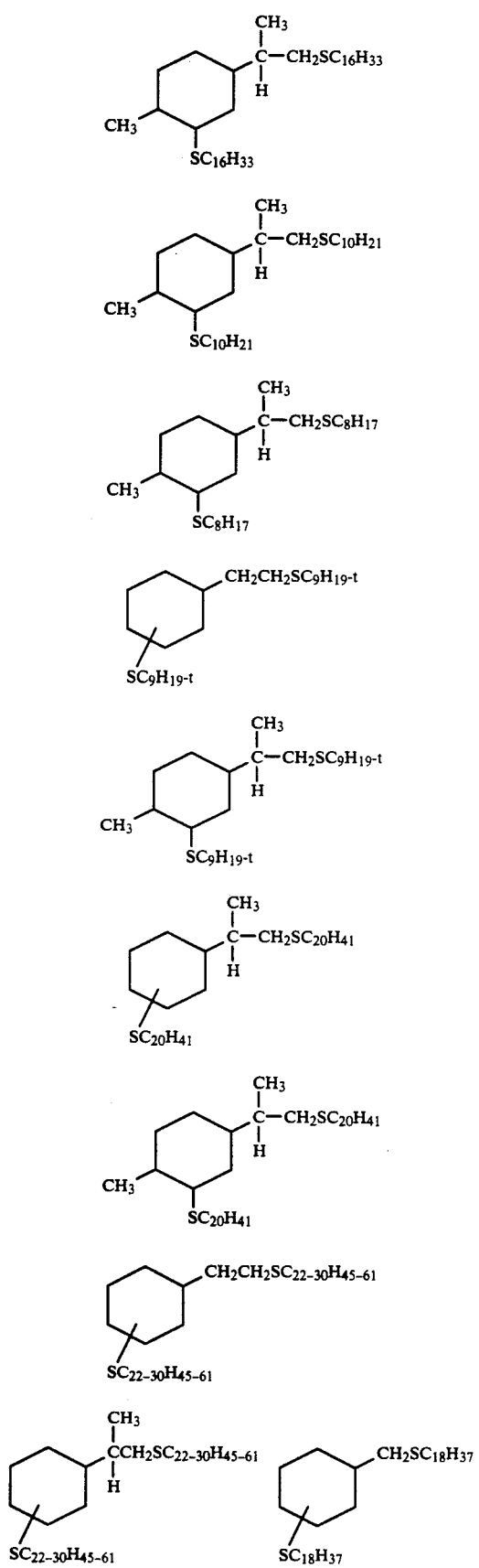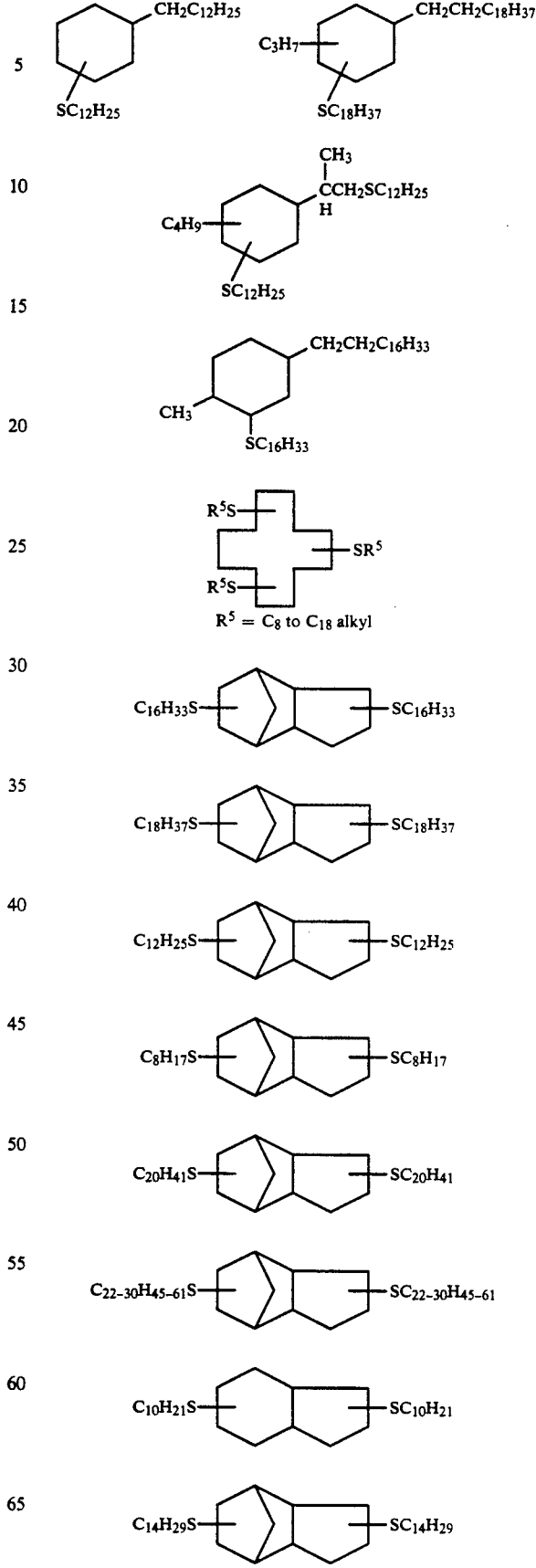

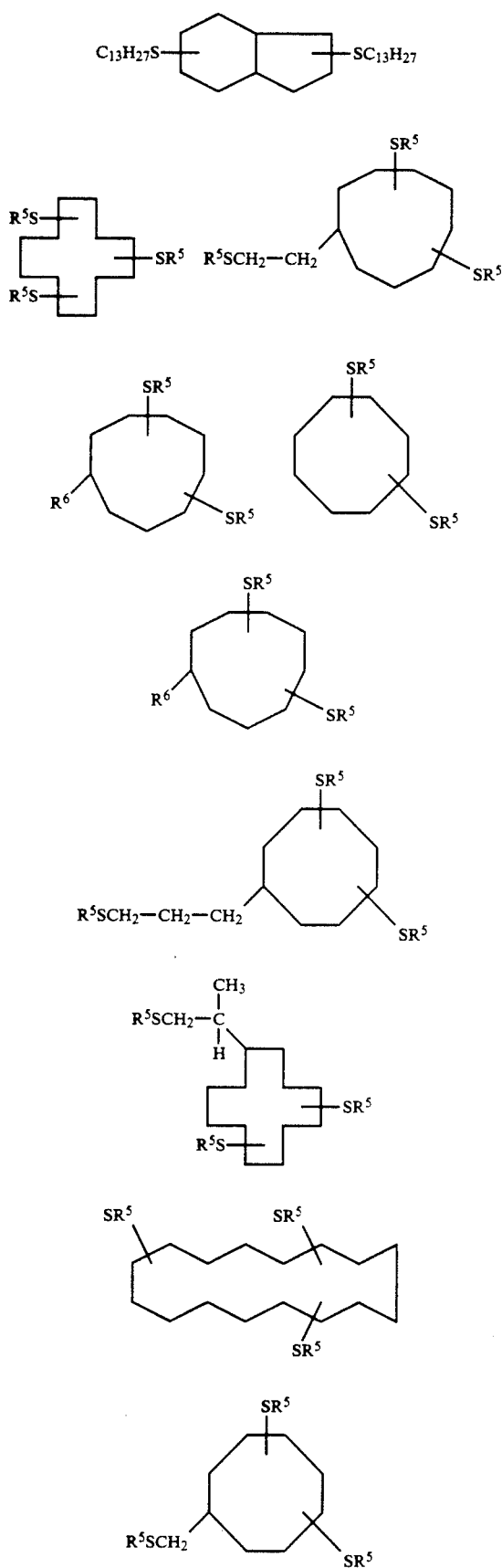
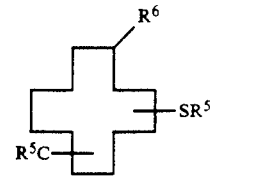
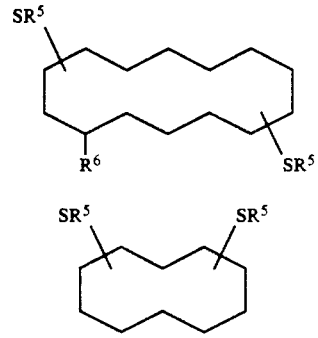
$R^5$ in the formulas set forth above represents an alky group of 8 to 24 carbon atoms and $R^6$ represents an alkyl group of 1 to 7 carbon atoms.
Non-limiting examples of preferred organic sulfide antioxidants useful in the present invention include, e.g.,
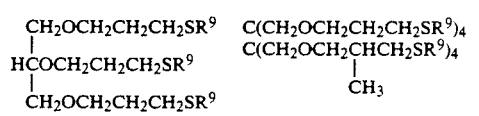
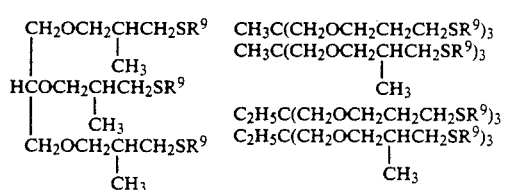
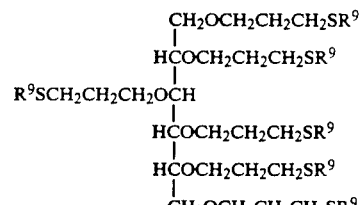
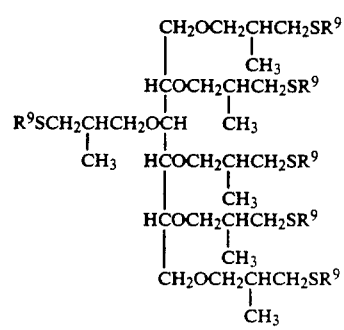

-continued
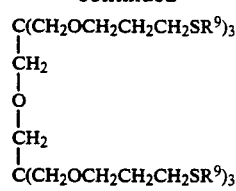
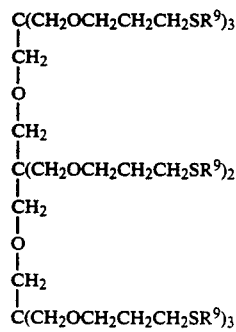
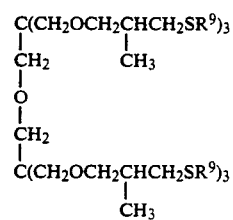
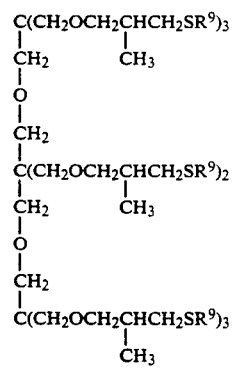
$O(CH_2CH_2CH_2SC_{12}H_{25})_2$
$O(CH_2CH_2CH_2SC_{10}H_{21})_2$
$O(CH_2CH_2CH_2SC_{16}H_{33})_2$
$O(CH_2CH_2CH_2SC_{18}H_{37})_2$
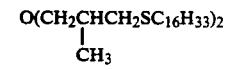
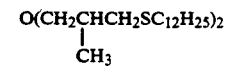
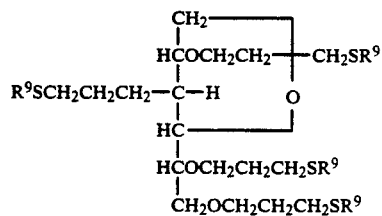
-continued
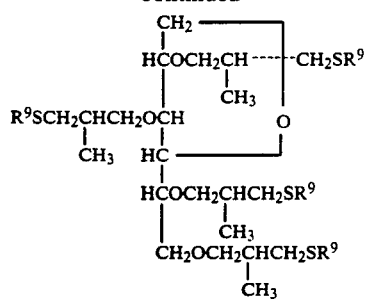
(plus other isomers of sorbitan)
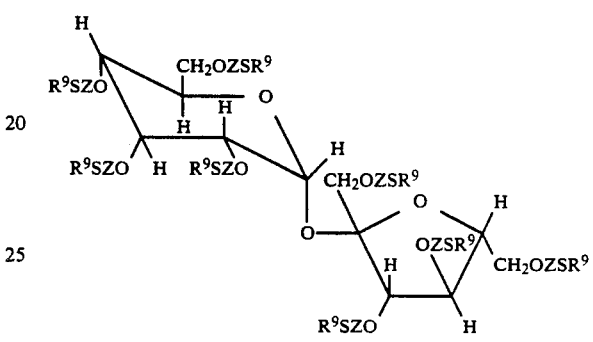
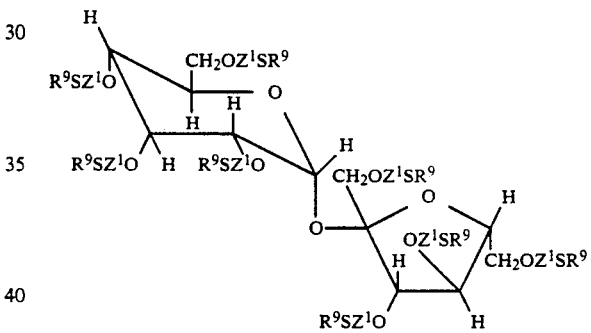
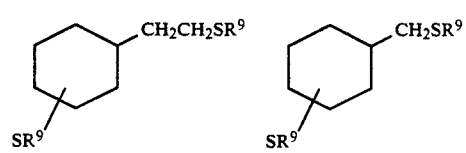
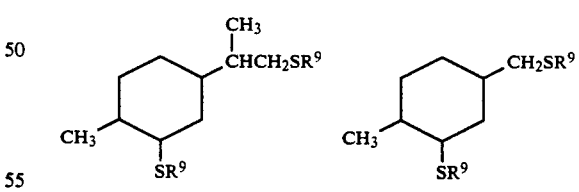
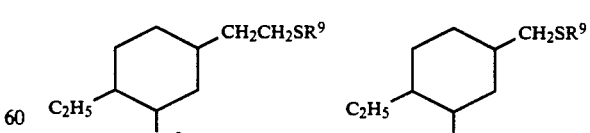
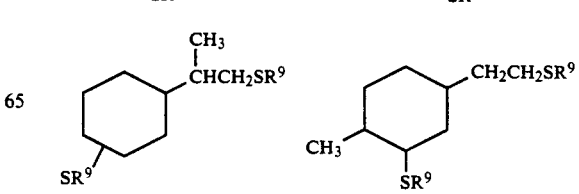

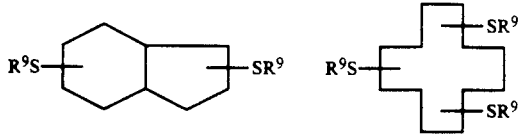

wherein $R^9$ represents an alkyl group of 10–18 carbons; $R^6$ is —H, —CH$_3$ or —C$_2$H$_5$ and Z; and Z' are as defined above.

Non-limiting examples of the most preferred organic sulfide antioxidants useful in the compositions of the present invention include, e.g.,

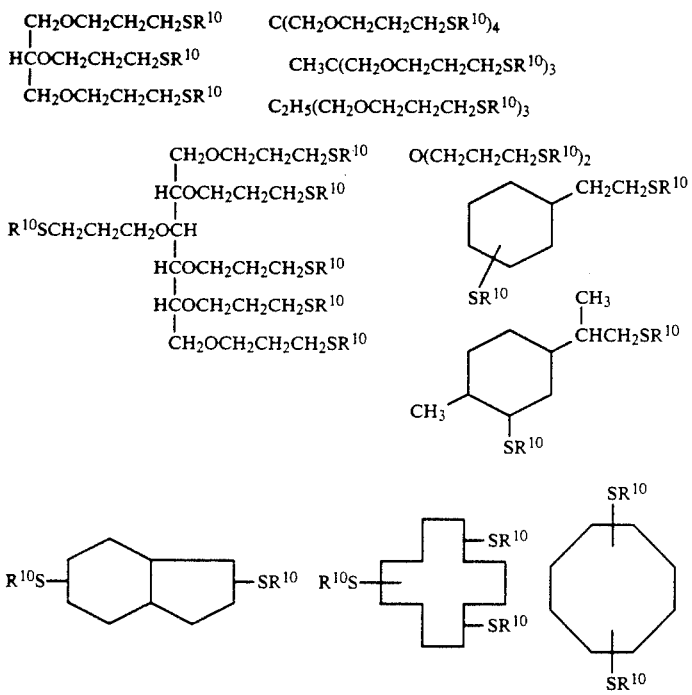

wherein $R^{10}$ represents an alkyl group of 12–18 carbons.

The organic sulfides of the present invention represented by Formula I may be prepared, for example, by the methods disclosed in U.S. Pat. Nos. 3,652,680 and 3,772,246, the disclosures of which are incorporated herein by reference. These methods are equally suitable for the preparation of the compounds of Formula II and III.

Compounds of Formula I may be prepared e.g., by first reacting a polyol (with two or more hydroxyl groups per molecule) with an allylic or substituted allylic halide (e.g., chloride, bromide, or iodide) in the presence of a base, such as sodium or potassium hydroxide. The amount of base used should be an amount sufficient to remove the hydrogen halide by-product and to form the corresponding polyallylic ether. Water or an inert solvent may be used if necessary to facilitate the separation of the by-product metal halide from the polyallylic ether.

Next, a mercaptan is added to the resultant polyallylic ether of the above reaction, under free radical conditions (i.e., in the presence of peroxides, azo compounds, ultra-violet light, etc.), in order to form the antioxidant compounds of this invention. The number of moles of mercaptan employed in this reaction is an amount at least equal to the number of double bonds in the polyallylic ether.

Compounds of Formula II and III may be prepared by adding a mercaptan to either a diallyl ether or an olefin, respectively, by the method described above for compounds represented by Formula I. Other appropriate methods useful for the preparation of compounds represented by Formula I, II or III of the present invention will be apparent to one skilled in the art based upon the present disclosure.

It should be pointed out that the sulfide antioxidants of Formula III are usually prepared as a mixture of isomers. For example, compounds, having the structure

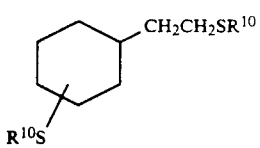

can have four possible isomers: 1,3-cis; 1,3-trans; 1,4-cis; and 1,4-trans disubstituted cyclohexanes while compounds having the structure

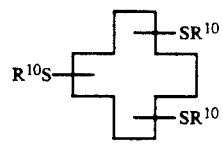

can have the three alkylthio groups substituted on the cyclododecane ring as follows: 1,4,8; 1,4,9; and 1,5,9. Other structures that fall under the definition of Formula III also are usually prepared as a mixture of two or more isomers.

Each of the individual isomers of a particular structure as well as a mixture of all of them fall within the scope of this invention.

The preparation techniques for the compounds of Formulas I, II and III result in trace amounts of unreacted mercaptan remaining with the organosulfide product. Even at low concentrations, mercaptans have very offensive odors that make an otherwise suitable organosulfide antioxidant undesireable for many applications, especially in the handling and packaging of food.

In order to determine the acceptable level of the trace mercaptan in the organosulfide, an odor panel study was conducted. As shown in Example 22, organosulfides having 5 ppm of a residual mercaptan were found by the panelists to have an odor which is less objectionable than a conventional antioxidant, dilauryl thiodipropionate, in a polypropylene resin sample. Thus, if the organosulfide antioxidants of the present invention contain no more than about 5 ppm of a residual mercaptan, the odor problem commonly associated with these antioxidants is overcome.

The concentration of the residual mercaptan may be lowered by selectively oxidizing the mercaptan through the consecutive addition of a base and an oxidizing agent, or the addition of a single reagent having both basic catalyzing and oxidizing properties.

The base may be a basic salt of a metal or a transition metal, such as sodium hydroxide, or an organic base, such as triethylamine or pyridine. Suitable reagents having both the basic catalyzing and oxidizing properties are metal peroxides, such as sodium peroxide, metal perborates, such as sodium perborate, and peroxide complexes of salts, e.g., sodium percarbonate.

The base is added to the mixture of the organosulfide antioxidant and the residual mercaptan in an amount of from about 0.01% to about 10%, and preferably from about 0.1% to about 5%, by weight of the mixture.

The oxidizing agents suitable for lowering the residual mercaptan include peroxides, such as hydrogen peroxide and organic peroxides. These agents are added to the mixture of the sulfide antioxidant and resiudal mercaptan in an amount of from about 0.1% to about 20%, and preferably about 0.2% to about 10%, by weight of the mixture.

The base should be added before the peroxide and can be added in one portion or over a period of time. The peroxide can also be added in one portion or over a period of time.

Since the base both catalyzes the oxidation of the mercaptan and decomposes the hydrogen peroxide, it is best to add hydrogen peroxide slowly over a period of 0.5 to 5.0 hours. In general, a slow continuous addition of peroxide favors complete removal of the trace amounts of mercaptan.

This selective oxidation step may be carried out with or without the addition of a solvent. If a solvent is employed, it should be capable of at least partially dissolving the mixture of the organosulfide antioxidant and the residual mercaptan, as well as the base and oxidizing agent. Suitable solvents for use in this step include methanol, ethanol, isopropanol, acetone, water and methyl ethyl ketone, with isopropanol and methyl ethyl ketone being preferred.

As used in this specification, the term "food grade" antioxidant refers to organosulfide compositions exhibiting an acute toxicity (expressed as $LD_{50}$) of at least 1.0 gram per kilogram of body weight when fed to rats, and an extractability from the thermoplastic or thermosetting resin with food simulating solvents whereby that the concentration in the human diet is less than 1 part per million (ppm). The procedures for determining the concentration in the human diet are reported in the USFDA's brochure, "Recommendations for Chemistry Data for Indirect Food Additives", dated September, 1988, which is hereby incorporated by reference.

Briefly, these procedures require that extraction studies be conducted to determine the concentration of the organosulfide in the human diet. Food simulating solvents are selected to simulate the extraction of the antioxidant from the polymer into foods which are expected to come into contact with a polymeric composition containing the antioxidant. In polypropylene, low density polyethylene and high density polyethylene, the USFDA requires the use of an aqueous solution of 8% by weight ethanol (8% ethanol) as the solvent simulating aqueous and acid food-types. Similarly, an aqueous solution of 95% by weight (95% ethanol) is used as the food simulating solvent for alcoholic and fatty food-types. Food simulating solvents for other resins are specified by the USFDA in the above-referenced brochure.

Once the measured extraction values are obtained for 8% ethanol and 95% ethanol, ($M_{8\%}$) and ($M_{95\%}$), respectively, the weight-average migration ($<M>$) is calculated as follows:

$$<M> = (M_{8\%}) \times (f_{aqueous} + f_{acidic}) + (M_{95\%}) \times (f_{alcoholic} + f_{fatty})$$

where $f_T$ is the food type distribution factor defined by the USFDA. The $f_T$ factor represents the use level in which a particular polymer resin has been found by the USFDA to come in contact with the various food-types.

The concentration of the antioxidant in the human diet, due to extractability with food simulating solvents, is calculated as $<M> \times (CF)$, where (CF) is the consumption factor for the polymer stabilized with the antioxidant. The consumption factor for a particular polymer represents the percent usage of the polymer as compared to the total of all polymers used in food application. Consumption factors for various polymers are defined in the USFDA brochure.

The procedure for determining acute toxicity values by force feeding specified amounts of the test compound to groups of laboratory test animals such as rats is well known. These values are usually reported in units of the number of grams or milligrams of the test compound per kilogram of body weight that is lethal to 50% of the population. The acute toxicity is usually reported as an acute oral median lethal dose ($LD_{50}$) and is calculated using a method described by S. Weil in an article that appeared in the September 1952 issue of Biometrics.

The thermoplastic or thermosetting polymeric resins which may be thermally and oxidatively stabilized by the novel food grade sulfide antioxidant compositions of this invention are exemplified, without limitation, by the following: polyolefins, such as linear low density polyethylene, low density polyethylene, high density polyethylene, polypropylene, copolymers of ethylene and propylene, copolymers of ethylene and vinyl acetate, polybutene-1, poly-3-methylbutene-1, poly-4-methylpentene-1, poly-4,4-dimethylpentene-1, polydecene-1, polydodecene-1, polybutadiene, poly(cis-1,4-isoprene), terpolymers of ethylene, propylene, and butadiene, terpolymers of ethylene, propylene, and dicyclopentadiene; polycarbonates; polyarylethers; polyamides; polyesters; polyacetals; polyarylsulfides; cellulose esters; polystyrene homopolymers (both crystalline and non-crystalline forms); expanded polystyrene; rubber-modified polystyrenes, such as high impact (HIPS), medium impact (MIPS), and super high impact grades; block copolymers of styrene and butadiene, such as styrene-butadiene (SB), styrene-butadiene-styrene (SBS), and butadiene-styrene-butadiene (BSB); unsaturated polyester thermosets; and blends of these polymers.

Preferred polymeric resins for use in the present invention include linear low density polyethylene, low density polyethylene, high density polyethylene, polypropylene, copolymers of ethylene and propylene, copolymers of ethylene and vinyl acetate, poly-4-methylpentene-1, polycarbonates derived from 2,2-bis(4-hydroxyphenyl)propane, polyethylene terephthalate, crystalline polystyrene, non-crystalline polystyrene, expanded polystyrene, high impact polystyrene (HIPS), medium impact polystyrene (MIPS), super high impact polystyrene, styrene-butadiene-styrene (SBS) block copolymers, butadiene-styrene-butadiene (BSB) block copolymers, and unsaturated polyesters crosslinked with styrene.

The organsulfide antioxidants are added to the polymeric resin in an amount necessary to give the desired thermal and oxidative stability to the resin. Of course, the exact amount of the organic sulfide antioxidant composition present in the polymeric resin according to the this invention will vary with the particular sulfide antioxidant and the polymeric resin used.

The non-toxic polymeric compositions of the present invention generally contain the organosulfide antioxidant in a weight ratio amount of the sulfide antioxidant to polymeric resin of about 1:10,000 to about 1:20 and preferably 1:2000 to about 1:100. The organosulfide antioxidants of the present invention may be used in combination with other auxiliary antioxidants, such as a hindered phenol. If an auxiliary antioxidant is used in combination with the organosulfide antioxidants of this invention, the weight ratio of the auxiliary antioxidant to the sulfide antioxidant of this invention is about 10:1 to about 1:10 and preferably about 1:1 to about 1:4.

The organosulfide antioxidants of the present invention may be added to the polymeric resin in any conventional manner. Appropriate methods for the addition of the present compounds to the polymeric resins will be evident to one skilled in the art based upon the present disclosure. For example, the sulfide antioxidant compositions may be added to the polymeric resin by methods known in the art such as blending, kneading, extruding, injection molding, calendering, etc., with the requirements that a uniform composition is produced.

Other additives such as talc, metal deactivators, calcium carbonate, calcium stearate, u.v. stabilizers such as benzophenones, benzotriazoles, salicylic acid esters, and hindered amines, etc may further be added to the polymeric resin formulations containing the present sulfide antioxidant compositions. The only proviso for use of any of these additives, as well as the auxiliary antioxidant, is that they be approved for use in food grade polymer formulations.

The non-toxic polymeric compositions of this invention may be used to form coatings, tank linings, film, sheet, fibers, tubes, bottles, packages and molded articles intended for contact with foods, beverages, and pharmaceuticals, and for use in medical devices. Specific applications include, without limitation, trays, containers/lids which include asceptic and barrier packages, retortable packages, microwavable cookware, packaging film, hot melt adhesives, bulk storage tanks, food and beverage bottles, blood bags, transfusion tubing and pharmaceutical packing. In many of these applications, the food, beverage, or pharmaceutical product will be in physical contact with the non-toxic polymeric composition.

The present invention will now be illustrated by reference to the following specific non-limiting examples.

EXAMPLE 1

Preparation of
$\beta$-(n-Octadecylthio)ethyl-3-(n-Octadecylthio)-Cyclohexane and
$\beta$-(n-Octadecylthio)ethyl-4-(n-Octadecylthio)-Cyclohexane Octadecene-1 (1044 grams, 4.13 moles) was stirred and heated in a three-necked flask under nitrogen to a pot temperature of 55° C. While stirring and heating, an ice-cold solution of 1.74 grams of Lupersol 546M75 (a 75% solution of t-amyl peroxyneodecanoate in odorless mineral spirits) in 176 grams of a mixture of $\beta$-mercaptoethyl-3-mercaptocyclohexane and $\beta$-mercaptoethyl-4-mercaptocyclohexane was added at the rate of 5.0 ml/minute. During the addition, the pot temperature was maintained at 55°–65° C. One-half hour after the addition was completed, 0.87 gram of Lupersol 546M75 was added every half-hour, while maintaining the pot temperature at about 60° C. Samples were periodically taken and the residual mercaptan content was determined. When the mercaptan content dropped to about 1000 ppm or less, the addition of Lupersol 546M75 was stopped. The total reaction time was about 5.5 hours. Excess octadecene-1 was stripped from the molten product at about 240° C. and 10 mm Hg. The residual mercaptan value, S(mercapto), was 500 ppm.

A portion of the crude product (150 grams) and methyl ethyl ketone (450 grams) were charged to a one-liter three necked baffled and jacketed reactor, heated to 65° C. and 2 grams of a 50% sodium hydroxide solution was added to the stirred mixture Hydrogen peroxide (4 ml of a 30% solution) was pumped into the reaction mixture over a one-hour period. The mixture was held at 65° C. for 30 minutes after the hydrogen peroxide had been added and then washed with 50 ml. of a 23% sodium chloride solution. The lower aqueous salt layer was drawn off and discarded and the upper methyl ethyl ketone layer was cooled to 5° C. over a three-hour period. The product began to oil out at 52° C. and solidified at 42° C. This slurry was decanted and the solid product collected by filtration. The reactor was washed with 150 grams of methyl ethyl ketone at 5° C. and these washings were used to wash the crude product on the filter. After drying at 35° C. under vacuum, 132 grams of product was obtained in 88% overall yield. Anal. Calc. for $C_{44}H_{88}S_2$: S(total), 9.44%; S(mercapto), 0. Found: S(total), 9.1%; S(mercapto), 1 ppm.

EXAMPLE 2

Preparation of 2,9-(n-Octadecylthio)-p-Menthane

A stirred mixture of 305 grams (1.498 moles) of 2,9-dimercapto-p-menthane and 786.8 grams (3.05 moles) of 1-octadecene, under a blanket of nitrogen, were heated to 80° C. To this mixture, 1.25 grams of 2,2'-azobis- (isobutyronitrile) dispersed in 25 grams of 1-octadecene was added in four equal portions over a four-hour period and then held at 80° C. for an additional four hours. The reaction mixture was then recrystallized from 1093 grams of hexane, collected by filtration, washed with 546 grams of cold hexane, and finally air dried to give 546 grams (40% yield) of product. The residual mercaptan value, S(mercapto), was found to be 360 ppm.

A portion of the crude product (75 grams) and 450 grams of isopropanol were charged into a one liter, baffled, jacketed reactor and heated to 65° C. One gram of a 50% aqueous sodium hydroxide solution was then added to the stirred mixture (stirred at 400 ppm with a 1¼ inch flat blade turbine). A 30% hydrogen peroxide solution (2.0 ml.) was then metered into the mixture with a syringe pump over a one-hour period. After the addition of the hydrogen peroxide, the mixture was held at 65° C. for 30 minutes. The temperature was then increased to 78° C. while stirring was continued. The stirred mixture was then cooled to 50° C. over a half-hour period. It was then further cooled to 35° C. over an additional two hour time frame and held at this temperature for a half hour longer. The slurry was drained and collected by filtration on a Buchner funnel. The reactor was washed with 150 grams of isopropoanol, which was then use to wash the filter cake. The product was then washed with 300 ml. of water and then dried in a vacuum oven at 35° C. An 89% yield (67 grams) of purified product was obtained, which had a mercaptan value, S(mercapto), of 2 ppm.

EXAMPLE 3

Preparation of Pentaerythritol Tetrakis (n-Hexadecylthiopropyl)ether

A 250 ml three-necked flask equipped with a magnetic stirrer, a condenser and a nitrogen inlet tube was first purged with nitrogen 107 grams of n-hexadecyl mercaptan (0.417 mole) was then charged and heated to 80° C. To the heated and stirred n-hexadecyl mercaptan, a solution of 0.2 gram of 2,2'-azobis(isobutyronitrile) in 29.64 grams (0.1 mole) of pure pentaerythritol tetraallyl ether was added dropwise over a 15-minute period. One-half hour after this addition was completed, 0.1 gram of 2,2'-azobis(isobutyronitrile) was added. Two more 0.1 gram additions of 2,2'-azobis-(isobutyronitrile) were made at half-hour intervals. After the last addition, the reaction was held at 80° C. for an additional hour. The crude product was recrystallized three times in 300 ml. of hexane yielding 57 grams of a white solid having a melting point of 55°–57° C. The elemental analysis found: C - 73.4%, H - 11.9%, S(total) - 10.0%, and S(mercapto) - 3 ppm. Calculated for $C_{98}H_{164}S_2$; C - 73.12%, H-12.43%, S(total) - 9.64% and S(mercapto) - 4 ppm.

EXAMPLE 4

Preparation of Pentaerythritol Tetrakis(n-Octadecylthiopropyl)ether

The procedure used for this example was identical to that set forth in Example 3, except that 119.4 grams of n-octadecyl mercaptan (0.417 mole) was reacted with 29.6 grams of pentaerythritol tetraallyl either in 300 ml of hexane. This reaction yielded 54 grams of a white solid having a melting point of 60°–80° C. The residual mercaptan value, S(mercapto) was 4 ppm.

EXAMPLE 5

Preparation of Sucrose 3-(n-Dodecylthio)propyl Ether Containing Approximately 6.7 n-Dodecylthio Groups per Mole A. Allylsucrose Intermediate Containing 6.7 Allyl Groups per Mole The allylsucrose intermediate containing approximately 6.7 allyl groups per mole is prepared by the method of M. Zief and E. Yanovsky, *Ind. and Eng. Chem.*, 41, 1967 (1949). This method involves the reaction of sucrose and an excess of allyl bromide in the presence of sufficient sodium hydroxide as a base, which is used to remove the hydrogen bromide by-product.

B. Sucrose 3-(n-Dodecylthio)propyl Ether Containing Approximately 6.7 n-Dodecylthio Groups per Mole The procedure that is used for this example is similar to that set forth in Example 3, except that n-dodecyl mercaptan (203.41 g., 1.01 moles) is reacted with allylsucrose (91.61 g., 0.15 mole) intermediate prepared above in A.

EXAMPLE 6

Preparation of Bis(3-hexadecylthiopropyl) Ether

The procedure that is used for this example is similar to that set forth in Example 3, except that n-hexadecyl mercaptan (129.26g., 0.5 mole) is reacted with diallyl ether (24.54g., 0.25 mole).

EXAMPLE 7

Extractability of the Product of Example 1 from Polypropylene

A. Sample Preparation

1. One hundred grams of polypropylene resin, 1.0 gram of Irganox® 1010 (a hindered phenolic antioxidant from Ciba-Geigy Corp.), 1.0 gram of calcium stearate, 3.0 grams of the product of Example 1, and about 50 ml. of methylene chloride were mixed together in a beaker until a uniform suspension was obtained. This suspension was then placed in a ventilated hood until all of the methylene chloride had evaporated (approximately two days). The resultant concentrate was then transferred to a Littleford mixer along with an additional 1900 grams of polypropylene resin and mixed thoroughly for four minutes at 1900 rpm.

The above formulation was then made into pellets by extruding it in a 1¼" single screw extruder at 260° C. using a ⅛" strand die The resultant rod, after passing through a water bath, was then chopped into pellets with a pelletizer. These pellets were then reextruded through the same extruder at 260° C. using a 4" sheet die. The resultant sheet (approximately 22 mils thick) was used in the extraction studies.

2. A polypropylene control was prepared by the identical procedure outlined above except that the product of Example 1 was omitted.

B. Extraction of Product of Example 1 from Polypropylene

1. The polymer film containing the product of Example 1 was cut into small pieces and placed in a 6 oz. glass jar. Total film area was 200 in² per jar. Approximately 175 ml of the specified extractant (8% or 95% ethanol) was added to cover the polymer strips and the jars were then sealed. All jars, prepared in this manner, were placed in an oven and subjected to the appropriate time/temperature profiles. For the 8% ethanol in an aqueous solution, the jars were heated for 2 hours at 190° F. followed by 238 hours at 120° F. For the 95% ethanol in an aqueous solution, the jars were heated for two hours at 173° F. followed by 238 hours at 120° F. At specified intervals, jars were removed from the oven and the extractant transferred and evaporated to dryness. The residue was redissolved in isooctane and a solution of iodine in isooctane added to form the iodine complex of the product of Example 1, which was then analyzed photometrically at 308 nm. by a method similar to that described in the following references: S.H. Hastings, Spectrophotometric Determination of Aliphatic Sulfides, *Anal. Chem.*, 25, 420–422 (1954). S.H. Hastings, ibid., 27, 564–565 (1955).

2. For the polymer film control (product of Example 1 omitted), the extraction and analysis procedure was identical to that described above for the film containing the product of Example 1.

Table I below summarizes the actual extraction results obtained for the product of Example 1 from polypropylene, using 8% and 95% ethanol as extractants.

TABLE I

| Extractant | Extraction Time (hrs) | Extraction Temp. (°F.) | Ex 1 (mg) | Control (mg) | Ex. 1 - Control (mg) | Ex. 1 - Control[a] (ppm) |
|---|---|---|---|---|---|---|
| 8% Ethanol | 2 | 190 | .0027 | .0033 | −.0006 | −.0003 |
| | 24 | 120 | .0037 | .0037 | 0 | 0 |
| | 96 | 120 | .0030 | .0037 | −.0007 | −.00035 |
| | 240 | 120 | .0047 | .0093 | −.0046 | −.0023 |
| 95% Ethanol | 2 | 173 | 5.97 | 1.02 | 4.95 | 2.48 |
| | 24 | 120 | 5.08 | 0.74 | 4.34 | 2.17 |
| | 96 | 120 | 5.26 | 1.08 | 4.18 | 2.09 |
| | 240 | 120 | 5.69 | 1.48 | 4.21 | 2.11 |

[a]The concentration of the sulfide antioxidant composition in ppm is calculated based on 200 in² of test polymer sample surface area and on 10 grams of "food" (10 ml. simulated solvent) per square inch as designated by the USFDA. Thus, to convert from mg. of antioxidant extracted to ppm, the former is divided by 2.

In order to determine the concentration of the product of Example 1 in the human diet due to extraction from polypropylene with food simulating solvents, the above results must be corrected for by the food-type distribution factors, ($f_T$), and the consumption factor, (CF).

The $f_T$ factors for 8% ethanol (aqueous and acidic extractant) and 95% ethanol (fatty and alcoholic extractant), as determined by the USFDA, are 0.68 and 0.32, respectively. The CF factor for polypropylene $CF_{pp}$) is 0.02 when used in conjunction with other polyolefins (low density and high density polyethylene) and when used by itself, the USFDA requires that a minimum CF of 0.05 be used A $CF_{pp}$ value of 0.05 will be used for the calculations.

The following equations were used to calculate the concentration of the product of Example 1 in the human diet due to extraction from polypropylene by both 8% and 95% ethanol. These equations can be found in the FDA brochure "Recommendations for Chemistry Data for Indirect Food Additive Petitions", Appendix IV, pp. 32–35, dated September 1988.

$$<M_{8\%}> = (f_{aqueous} + f_{acidic})(M_{8\%})$$

$$<M_{95\%}> = (f_{fatty} + f_{alcoholic})(M_{95\%})$$

where $<M_{8\%}>$ and $<M_{95\%}>$ are the weight average migration for 8% and 95% ethanol, respectively; and ($M_{8\%}$) and ($M_{95\%}$) are the measured extraction values obtained for 8% ethanol and 95% ethanol, respectively; and $(CF_{pp})(<M>)$ = Concentration of antioxidant in the human diet due to extraction by the respective solvent.

The results obtained are shown below:

| Extractant | $(CF_{pp})(<M>)$ |
|---|---|
| 8% Ethanol | 0.0002 ppm[b] |
| 95% Ethanol | 0.040 ppm[c] |

[b]The 240-hour value was used from Table I above as the worst case estimate of migration and is not corrected for the polymer blank since control and sample values were essentially the same.
[c]The 2-hour value from Table I was used (after correction for the polymer blank) since this represented the worst case estimate of migration.

The sum of the foregoing results (approx. 0.04 ppm) represents the concentration of the product of Example 1 in the human diet due to extraction from polypropylene with solvents simulating aqueous, acidic, alcoholic and fatty food types. This data demonstrates that the product of Example 1 does not represent a toxicity hazard based on extractability from polypropylene.

EXAMPLE 8

Extractability of the Product of Example 1 from Low Density Polyethylene

A. Sample Preparation

The sample preparation was identical to that described for polypropylene in Example 7, except that the extrusion temperature was 190° C. and the sheet thickness was about 30 mils.

B. Extraction of Product of Example 1 from Low Density Polyethylene

The extraction procedure was identical to that described for polypropylene in Example 7. Table II below summarizes the actual extraction results obtained for the product of Example 1 from low density polyethylene, using and 95% ethanol as extractants.

TABLE II

| Extractant | Extraction Time (hrs) | Extraction Temp. (°F.) | Ex 1 (mg) | Control (mg) | Ex. 1 - Control (mg) | Ex. 1 - Control[a] (ppm) |
|---|---|---|---|---|---|---|
| 8% Ethanol | 2 | 190 | .003 | 0 | .003 | .0015 |
| | 24 | 120 | .003 | 0 | .003 | .0015 |
| | 96 | 120 | .004 | .002 | .002 | .001 |
| | 240 | 120 | .003 | .006 | −.003 | −.0015 |
| 95% Ethanol | 2 | 173 | 5.32 | 0.31 | 5.01 | 2.51 |
| | 24 | 120 | 8.71 | 0.78 | 7.93 | 3.97 |
| | 96 | 120 | 9.34 | 1.07 | 8.27 | 4.14 |
| | 240 | 120 | 10.14 | 1.50 | 8.64 | 4.32 |

[a]Calculated using the procedure described above for Table 1.

The food-type distribution factors ($f_T$) for 8% and 95% ethanol with low density polyethylene are 0.68 and 0 32, respectively, and the consumption factor ($CF_{LDPE}$) for low density polyethylene is 0.18. Using the same equations given in Example 7, the concentration of the product of Example 1 in the human diet due to extraction by the respective solvent was calculated The results are given below:

| Extractant | $(CF_{LDPE})(<M>)$ |
|---|---|
| 8% Ethanol | 0.0002 ppm[b] |

-continued

| Extractant | $(CF_{LDPE})(<M>)$ |
|---|---|
| 95% Ethanol | 0.249 ppm[c] |

[b] The 96-hour value was used from Table II above as the worst case estimate of migration and is not corrected for the polymer blank since control and sample values were essentially the same.
[c] The 240-hour value from Table II was used (after correction for the polymer blank) since this represented the worst case estimate of migration.

The sum of the foregoing results (approx 0.25 ppm) represents the concentration of the product of Example 1 that would be extracted from low density polyethylene into the human diet by solvents simulating aqueous, acidic, alcoholic and fatty food types. This data demonstrates that the product of Example 1 does not represent a toxicity hazard based on extractability from low density polyethylene.

EXAMPLE 9

Extractability of the Product of Example 1 from High Density Polyethylene

A. Sample Preparation

The sample preparation was identical to that described for polypropylene in Example 7 except that the extrusion temperature was 240° C. and the sheet thickness was about 30 mils.

B. Extraction of Product of Example 1 from High Density Polyethylene

The extraction procedure was identical to that described for polypropylene in Example 7. Table III below summarizes the actual extraction results obtained for the product of Example 1 from high density polyethylene using 8% and 95% ethanol as extractants.

TABLE III

| Extractant | Extraction Time (hrs) | Extraction Temp. (°F.) | Ex. 1 (mg) | Control (mg) | Ex. 1 - Control (mg) | Ex. 1 - Control[a] (ppm) |
|---|---|---|---|---|---|---|
| 8% Ethanol | 2 | 190 | .005 | .043 | −.038 | −.019 |
|  | 24 | 120 | .004 | .009 | −.005 | −.0025 |
|  | 96 | 120 | .008 | .005 | .003 | .0015 |
|  | 240 | 120 | .006 | .007 | −.001 | −.0005 |
| 95% Ethanol | 2 | 173 | 4.53 | 0.15 | 4.38 | 2.19 |
|  | 24 | 120 | 1.94 | 0.13 | 1.81 | 0.91 |
|  | 96 | 120 | 1.60 | 0.22 | 1.38 | 0.69 |
|  | 240 | 120 | 1.31 | 0.26 | 1.05 | 0.53 |

[a] Calculated using the procedure described above for Table I

The food-type distribution factors ($f_T$) for 8% and 95% ethanol with high density polyethylene are 0.68 and 0.32, respectively, and the consumption factor ($CF_{HDPE}$) for low density polyethylene is 0.13. Using the same equations given in Example 7, the concentration of the product of Example 1 in the human diet due to extraction by the respective solvents was calculated. The results are given below:

| Extractant | $(CF_{HDPE})(<M>)$ |
|---|---|
| 8% Ethanol | 0.0003 ppm[b] |
| 95% Ethanol | 0.091 ppm[c] |

[b] The 96 hour value was used from Table III above as the worst case estimate of migration and is not corrected for the polymer blank since control and sample values were essentially the same.
[c] The 2 hour value from Table III was used (after correction for the polymer blank) since this represented the worst case estimate of migration.

The sum of the foregoing results, (appox. 0.09 ppm.) represents the concentration of the product of Example 1 that would be extracted from high density polyethylene into the human diet by solvents representing aqueous, acidic, alcoholic and fatty food types. This data demonstrates that the product of Example 1 would not represent a toxicity hazard based on extractability from high density polyethylene.

EXAMPLE 10

Acute Toxicity of the Product of Example 1

Five male and five female Sprague-Dawley rats, weighing approximately 200 to 300 grams at initiation, were kept under observation for a period of 3-5 days prior to the commencement of the test. These animals were individually housed in wire mesh bottom cages in a controlled environment and were fasted overnight (approximately 18 hours) prior to receiving a single oral dose (by gavage) of 5.0 gm/kg body weight at a constant concentration, of the product of Example 1. All animals were weighed prior to dosing and at termination of the test. They were observed frequently on the day of dosing and twice daily for a total of 15 days. All gross and visible toxic or pharmacological effects were recorded and any animals that died during the study were subject to gross necropsy All abnormalities were recorded.

The acute oral $LD_{50}$ value for the product of Example 1 was >5.0 gm/kg.

EXAMPLE 11

Acute Toxicity of the Product of Example 2.

Five male and five female Sprague-Dawley rats, weighing approximately 200 to 300 grams, were individually housed in wire meshed bottom cages in a controlled environment and offered food and water ad libitum. After an acclimation period of at least five days, the animals were assigned to the test. The animals were fasted overnight prior to receiving a single oral dose of the product of Example 2 at 5.0 gm/kg body weight at a constant concentration. They were observed frequently on the day of dosing and twice daily for a total of 15 days. All external signs of toxicity of pharmacological effects were noted. Body weights of the animals were recorded initially, at days 8 and 15 or at death. All animals that died during the study and those sacrificed at termination (day 15) were subject to a gross necropsy and abnormalities were noted.

The acute oral $LD_{50}$ value for the product of Example 2 was >5.0 gm/kg.

EXAMPLE 12-20

Examples 12 to 20 illustrate the greater stability of the organic sulfide antioxidants of this invention in comparison to conventional sulfide antioxidants.

Small samples of antioxidants (10-25 mg) were heated in platinum boats at a rate 10° C. per minute. The temperature necessary to cause a weight loss of 5% was then determined. The gas flow (nitrogen or air) was 200 cc per minute in a duPont Model 9900 Thermogravimetric Analyzer.

Examples 12-16 are conventional antioxidants used in the plastics industry. The following antioxidants were used in Examples 12-16.

DSTDP—Distearyl Thiodipropionate
DLTDP—Dilauryl Thiodipropionate
DSPDPH—Distearyl Pentaerythritol Diphosphite
TBPBPH—Tetrakis(2,4-di-t-butylphenyl)-4,4'-biphenylene-diphosphonite
TBPP—Tris(2,5-di-t-butylphenyl) Phosphite The data in Table IV illustrates the temperature at which a 5% weight loss occurs for a series of antioxidants. Examples 17-20 are sulfide antioxidants in accordance with the present invention.

As can be seen from Table IV the temperature at which a 5% weight loss occurs is considerably higher for the compounds according to the present invention as compared to conventional antioxidants. These results are consistent regardless of whether the analysis is run in the presence of air or nitrogen.

TABLE IV

| | Thermogravimetric Analysis | | |
|---|---|---|---|
| | | 5% Weight Loss (°C.) | |
| Example No. | Antioxidant | Nitrogen | Air |
| 12 | DSTDP | 271 | 266 |
| 13 | DLTDP | 308 | 259 |
| 14 | DSPDPH | 252 | 259 |
| 15 | TBPBPH | 171 | 160 |
| 16 | TBPP | 291 | 280 |
| 17 | Product of Ex. 1 | 354 | 315 |
| 18 | Product of Ex. 2 | 340 | 300 |
| 19 | Product of Ex. 3 | 368 | Not Evaluated |
| 20 | Product of Ex. 4 | 376 | Not Evaluated |

EXAMPLE 21

This example demonstrates the efficacy of the product of Example 1 as an antioxidant for a polymeric resin.

Test specimens were first made from 100 parts by weight of polypropylene, 0.1 parts by weight of pentaerythritol tetrakis(3,5-di-t-butyl-4-hydroxyhydrocinnamate), 0.1 parts by weight of calcium stearate and 0.3 parts by weight of additives shown in Table V. A methylene chloride slurry of these ingredients was made and the solvent was evaporated The resulting mixtures were then blended in an intensive mixer. The mixtures were then pelletized in a laboratory extruder at a temperature of 250° C.

The pellets were injection molded at 250° C. into test specimens (125 mil×⅛×2 inches). The test specimens were aged in racks suspended from a slowly rotating Ferris wheel in a forced air oven at 150° C. Failure as noted in Table V was the time period for the formation of a discolored and firable area on the specimen.

TABLE V

| Additive | Avg. Days to Failure |
|---|---|
| None | 35 |
| DSTDP | 95 |
| Product of Ex. 1 | 141 |

EXAMPLE 22

This example demonstrates the low odor properties of the antioxidants of this invention.

Sulfides containing known amounts of mercaptan were prepared for an odor panel study by blending. The proper portions of sulfides were mixed, melted, solidified, and reground into uniform powders. For example, the sulfide containing 30 ppm $S_{RSH}$ in Table VI was prepared by mixing 90 parts of a sulfide containing 1 ppm $S_{RSH}$ (Example 1) with 10 parts of a sulfide containing 290 ppm $S_{RSH}$ and, similarly, the sulfide containing 15 ppm $S_{RSH}$ was prepared by mixing 48.3 parts of a sulfide containing 30 ppm $S_{RSH}$ with 51.7 parts of a sulfide containing 1 ppm $S_{RSH}$. The control was distearyl thiodipropionate (DSTDP).

Polypropylene pellets were made from 100 parts by weight polypropylene, 0.1 parts by weight of pentaerythritol tetrakis [3,5-di-t-butyl-4-hydroxyhydrocinnamate], 0.1 parts by weight of calcium stearate and 0.6 parts by weight of the sulfide additives. The resulting mixtures were blended and extruded according to the method of Example 7, part Al.

The pellets were placed in a 16 oz. resealable glass jar to about one half the volume. The odor of the pellets was evaluated in an odor panel of 30 human panelists. Each panelist rated the pellets from a field of selection starting with "strongly unpleasant" having a rating of −10, to "neutral" having a rating of 0, to "like strongly" having a rating of +10. The responses of the panelist were averaged and reported in Table VI.

TABLE VI

| Sulfide | ppm $S_{RSH}$ | Odor in Polypropylene |
|---|---|---|
| DSTDP | 0 | −1.37 |
| Product of Example 1 | 5 | −1.17 |
| Product of Example 1 | 15 | −1.50 |
| Product of Example 1 | 30 | −1.47 |
| Product of Example 1 | 60 | −1.47 |

The results of Table VI clearly show an increase in the unpleasantness of the polypropylene when the mercaptan residues in the sulfide increase above 5 ppm $S_{RSH}$. DSTDP a well known sulfide antioxidant is more odorous than product of Example 1 containing 5 ppm $S_{RSH}$.

Various changes and modifications can be made to the above-described embodiments without departing from the spirit and scope of the present invention.

We claim:

1. A non-toxic polymeric composition adapted for the handling and packaging of foods, beverages or pharmaceuticals, or for use in medical devices comprising a polyolefin resin and a food grade organosulfide antioxidant having no more than about 5 parts per million of free mercaptan groups, a $LD_{50}$ of at least 1.0 g/kg when fed to rats, an extractability from the polyolefin resin with food simulating solvents whereby the concentration in the human diet is less than about 1 part per million and having the Formula I, II or III:

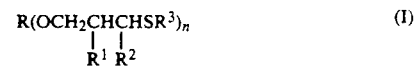

$$R(OCH_2CHCHSR^3)_n \quad (I)$$
$$\phantom{R(OCH_2C}| \phantom{CH}|$$
$$\phantom{R(OCH_2CH}R^1\,R^2$$

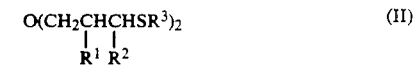

$$O(CH_2CHCHSR^3)_2 \quad (II)$$
$$\phantom{O(CH_2C}| \phantom{CH}|$$
$$\phantom{O(CH_2CH}R^1\,R^2$$

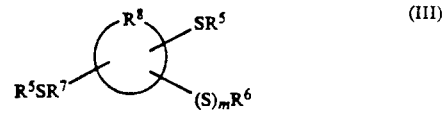

(III)

wherein:
m is 0 or 1;
n is an integer of 2 to 15;
R is a substituted or unsubstituted aliphatic group of 2 to 30 carbons, a substituted or unsubstituted alicyclic group of 5 to 20 carbons, a substituted or unsubstituted aliphatic group of 2 to 30 carbons where any of up to 6 carbon atoms are replaced with an O or S heteratom, a substituted or unsubstituted alicyclic group of 5 to 20 carbons where any of up to 6 carbon atoms are replaced with an O or S heteroatom, with the proviso that the heteroatom must be separated from each other and from the portion of the compound to which the R group is bonded by at least one carbon atom, the substituents for R being —OH, —$SR^4$ or —$OR^4$, wherein $R^4$ is an alkyl group of 1 to 30 carbons or a cycloalkyl group of 5 to 20 carbons;

$R^1$ and $R^2$ are independently H or an alkyl group of 1 to 4 carbons;

$R^3$ is an alkyl group of 1 to 24 carbons or a cycloalkyl group of 5 to 20 carbons;

$R^5$ is an alkyl group of 1 to 24 carbons;

$R^6$ is H or an alkyl group of 1 to 24 carbons, with the provisos that when m=0, $R^6$ is H or an alkyl group of 1 to 7 carbons and when m=1, $R^6$ is alkyl group of 1 to 24 carbons;

$R^7$ is a direct bond or an alkylene group of 1 to 4 carbons; and $R^8$ is a monocyclic, bicyclic or tricyclic cycloalkyl group of 5 to 16 carbons.

2. A non-toxic composition according to claim 1 wherein the food simulating solvents are aqueous solutions of 8 wt. % ethanol and 95 wt. % ethanol.

3. A non-toxic polymeric composition according to claim 1 wherein the polyolefin resin is selected from the group consisting of low density polyethylene, linear low density polyethylene, high density polyethylene, polypropylene, ethylene-propylene copolymers and ethylene-vinyl acetate copolymers.

4. A non-toxic polymeric composition according to claim 3 wherein the organosulfide is beta-(n-octadecylthio)ethyl-3 (and 4)-(n-octadecylthio)cyclohexane.

5. A non-toxic polymeric composition according to claim 1 wherein the weight ratio of the organosulfide to the polyolefin resin is about 1:10,000 to about 1:20.

6. A non-toxic polymeric composition according to claim 1 wherein the weight ratio of the organosulfide to the polyolefin resin is about 1:2000 to about 1:100.

7. A non-toxic polymeric composition according to claim 1, further comprising an auxiliary thermal or light stabilizer.

8. A non-toxic polymeric composition according to claim 7 wherein the auxiliary thermal or light stabilizer is selected from the group consisting of hindered phenols, phosphites, organic amines, benzophenones and benzotriazoles.

9. A method of forming a non-toxic polymeric composition stabilized against oxidative or thermal degradation, comprising adding to a thermoplastic or thermosetting resin an organosulfide antioxidant having no more than about 5 parts per million of free mercaptan groups and having the Formula I, II or III:

$$R(OCH_2CHCHSR^3)_n \quad (I)$$
$$\phantom{R(OCH_2C}R^1\phantom{CH}R^2$$

$$O(CH_2CHCHSR^3)_2 \quad (II)$$
$$\phantom{O(CH_2C}R^1\phantom{CH}R^2$$

(III)

wherein:

m is 0 or 1;

n is an integer of 2 to 15;

R is a substituted or unsubstituted aliphatic group of 2 to 30 carbons, a substituted or unsubstituted alicyclic group of 5 to 20 carbons, a substituted or unsubstituted aliphatic group of 2 to 30 carbons where any of up to 6 carbon atoms are replaced with an O or S heteroatom, a substituted or unsubstituted alicyclic group of 5 to 20 carbons where any of up to 6 carbon atoms are replaced with an O or S heteroatom, with the proviso that the heteroatom must be separated from each other and from the portion of the compound to which the R group is bonded by at least one carbon atom, the substituents for R being —OH, —$SR^4$ or —$OR^4$, wherein $R^4$ is an alkyl group of 1 to 30 carbons or a cycloalkyl group of 5 to 20 carbons;

$R^1$ and $R^2$ are independently H or an alkyl group of 1 to 4 carbons;

$R^3$ is an alkyl group of 1 to 24 carbons or a cycloalkyl group of 5 to 20 carbons;

$R^5$ is an alkyl group of 1 to 24 carbons;

$R^6$ is H or an alkyl group of 1 to 24 carbons, with the provisos that when m=0, $R^6$ is H or an alkyl group of 1 to 7 carbons and when m=1, $R^6$ is alkyl group of 1 to 24 carbons;

$R^7$ is a direct bond or an alkylene group of 1 to 4 carbons; and $R^8$ is a monocyclic, bicyclic or tricyclic cycloalkyl group of 5 to 16 carbons.

10. A method according to claim 9 wherein the organosulfide antioxidant has a $LD_{50}$ of at least 1.0 g/kg when fed to rats, an extractability from the resin with food simulating solvents whereby the concentration in the human diet is less than about 1 part per million.

11. A method according to claim 10 wherein the solvent is ethanol.

12. A method according to claim 10 wherein the resin is selected from the group consisting of polyolefin, polycarbonate, polyaryl sulfide, cellulose esters, styrene homopolymer, rubber-modified polystyrene, styrene block copolymers and polyesters.

13. A method according to claim 12 wherein the resin is selected from the group consisting of low density polyethylene, polyethylene, high density polyethylene and polypropylene.

14. A method according to claim 13 wherein the organosulfide is beta-(n-octadecylthio)ethyl-3 (and 4)-(n-octadecylthio)cyclohexane.

15. A method according to claim 9 wherein the organosulfide is represented by Formula I or II, wherein R is:

$$CH_2-CH-CH_2,\ -CH_2-\underset{\underset{CH_2-}{|}}{\overset{\overset{CH_2-}{|}}{C}}-CH_2-,\ C_2H_5-\underset{\underset{CH_2-}{|}}{\overset{\overset{CH_2-}{|}}{C}}-CH_2-,$$

$$CH_3-\underset{\underset{CH_2-}{|}}{\overset{\overset{CH_2-}{|}}{C}}-CH_2-,\ \text{and}\ -CH_2-\underset{\underset{H}{|}}{\overset{\overset{H}{|}}{C}}-\underset{\underset{H}{|}}{\overset{\overset{}{|}}{C}}-\underset{\underset{H}{|}}{\overset{\overset{}{|}}{C}}-CH_2,\ \text{and}$$

wherein $R^1$ and $R^2$ are H; and $R^3$ is an alkyl group of 12 to 18 carbons.

16. A method according to claim 9 wherein the organo sulfide is represented by Formula III and has one of the following structures:

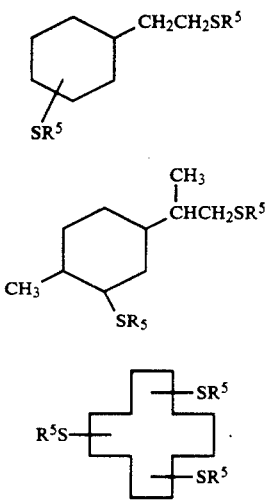

17. A method according to claim 9 wherein the weight ratio of the organosulfide to the polymeric resin is about 1:10,000 to about 1:20.

18. A method according to claim 17 wherein the weight ratio of the organosulfide to the polymeric resin is about 1:2000 to about 1:100.

19. A method according to claim 9, further comprising the addition of an auxiliary thermal or light stabilizer to the resin.

20. A method according to claim 19 wherein the auxiliary thermal or light stabilizer is selected from the group consisting of hindered phenols, phosphites, organic amines, benzophenones and benzotriazoles.

21. In a non-toxic polymeric composition comprising a thermoplastic or thermosetting resin and an organosulfide antioxidant having no more than about 5 parts per million of free mercaptan groups and having the Formula I, II or III:

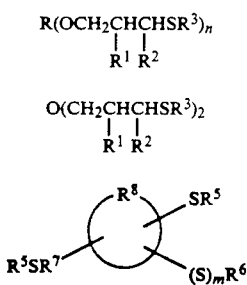

where the improvement comprises reacting excess free mercaptan with hydrogen peroxide in the presence of sodium hydroxide and methyl ethyl ketone at a temperature of at least 65° C. wherein the organosulfide antioxidant has a LD$_{50}$ of at least 1.0 g/kg when fed to rats and an extractability concentration in the human diet is less than about 1 part per million.

22. A non-toxic polymeric composition according to claim 21 wherein the food simulating solvents comprise an aqueous ethanol solution.

23. A non-toxic polymeric composition according to claim 22 wherein the polymeric resin is selected from the group consisting of polyolefin, polycarbonate, poly- aryl sulfide, cellulose esters, styrene homopolymer, rubber-modified polystryene; styrene block copolymers and polyesters.

24. A non-toxic polymeric composition according to claim 23 wherein the organosulfide is beta-(n-octadecylthio)ethyl-3 (and 4)-(n-octadecylthio)cyclohexane.

25. A non-toxic polymeric composition according to claim 21 wherein the organosulfide is represented by Formula I or II, wherein R is:

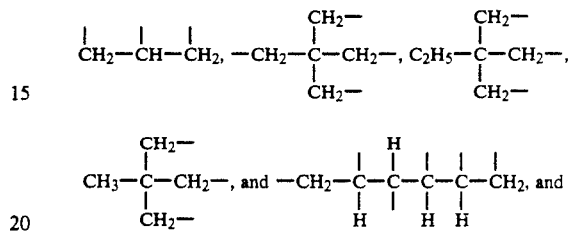

wherein
R$^1$ and R$^2$ are H; and
R$^3$ is an alkyl group of 12 to 18 carbons.

26. A non-toxic polymeric composition according to claim 21 wherein the organo sulfide is represented by Formula III and has one of the following structures:

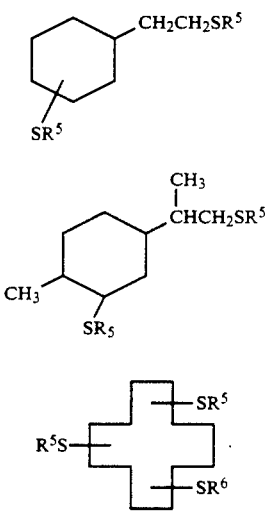

27. A non-toxic polymeric composition according to claim 21 wherein the weight ratio of the organosulfide to the polymeric resin is about 1:10,000 to about 1:20.

28. A non-toxic polymeric composition according to claim 21 wherein the weight ratio of the organosulfide to the polymeric resin is about 1:2000 to about 1:100.

29. A non-toxic polymeric composition according to claim 21, further comprising an auxiliary thermal or light stabilizer.

30. A non-toxic polymeric composition according to claim 29 wherein the auxiliary thermal or light stabilizer is selected from the group consisting of hindered phenols, phosphates, organic amines, benzophenones and benzotriazoles.

31. A non-toxic polymeric product made from an containing the composition of claim 21 for the handling and packaging of foods, beverages or pharmaceuticals, or for use in medical devices.

32. A non-toxic polymeric product of claim 31 in the form of coatings, tank linings, film, sheet, fibers, tubes, bottles, packages or molded articles.

33. A non-toxic polymeric product of claim 31 in the form of food can lines, bulk storage tanks, beverage bottles, food wraps, blood bags, transfusion tubing, and pharmaceutical packing.

34. A food, beverage or pharmaceutical product in contact with a non-toxic polymeric product made from or containing the composition of claim 21.

* * * * *